United States Patent
Ozzie et al.

(10) Patent No.: US 6,640,241 B1
(45) Date of Patent: Oct. 28, 2003

(54) METHOD AND APPARATUS FOR ACTIVITY-BASED COLLABORATION BY A COMPUTER SYSTEM EQUIPPED WITH A COMMUNICATIONS MANAGER

(75) Inventors: Raymond E. Ozzie, Manchester, MA (US); Kenneth G. Moore, Westford, MA (US); Robert H. Myhill, Newton, MA (US); Brian M. Lambert, North Andover, MA (US)

(73) Assignee: Groove Networks, Inc., Beverly, MA (US)

( * ) Notice: Subject to any disclaimer, the term of this patent is extended or adjusted under 35 U.S.C. 154(b) by 0 days.

(21) Appl. No.: 09/357,007

(22) Filed: Jul. 19, 1999

(51) Int. Cl.$^7$ ................................................ G06F 15/16
(52) U.S. Cl. ...................... 709/204; 709/231; 709/248
(58) Field of Search ................................. 709/201, 248, 709/204, 205, 200, 231; 345/330; 370/260, 261, 263

(56) References Cited

U.S. PATENT DOCUMENTS

| | | | | |
|---|---|---|---|---|
| 5,220,657 A | * | 6/1993 | Bly et al. ................ | 709/248 |
| 5,538,255 A | | 7/1996 | Barker | |
| 5,822,525 A | * | 10/1998 | Tafoya et al. ............. | 709/201 |
| 5,861,883 A | * | 1/1999 | Cuomo et al. ............ | 345/326 |

(List continued on next page.)

FOREIGN PATENT DOCUMENTS

| | | |
|---|---|---|
| GB | 2 303 946 | 3/1997 |
| GB | 2 303 946 A | 3/1997 |
| GB | 2 303 946 A | 5/1997 |
| JP | 10-240651 | 9/1998 |

(List continued on next page.)

OTHER PUBLICATIONS

Koch, Michael, "Design Issues and Model for a Distributed Multi–User Editor", Computer Supported Cooperative Work, 1995, 359–378, vol. 3, Kluwer Academic Publishers, Boston, MA.

Sun, Chengzheng, et al., "Achieving Convergence, Casuality–Preservation, and Intention–Preservation in Real–time Cooperative Editing Systems", ACM Transactions on Computer–Human Interaction, Mar., 1988, pp. 2–42, vol. 5, No. 1.

(List continued on next page.)

Primary Examiner—Saleh Najjar
(74) Attorney, Agent, or Firm—Kudirka & Jobse, LLP

(57) ABSTRACT

A communications manager provides communication services for an activity-based collaboration system, in which data change requests comprising deltas are communicated over a network between network-capable devices. The communications manager is operable on a local network capable device for sending locally-generated deltas over the network to at least one remote network-capable device and for receiving remotely-generated deltas over the network from the at least one remote network-capable device. The communications manager can send the deltas via unicasting, multicasting, or broadcasting techniques. The communications manager is responsive to network connection status information indicating that the remote network-capable device is connected to the network for sending the local deltas directly to an address for the remote network-capable device. A presence mechanism maintains and distributes, on request, the network connection status information, which it acquires from each of the network-capable devices. The communications manager is also responsive to the network connection status information indicating that the remote network-capable device is disconnected from the network for sending the local deltas to an address of a relay. The relay stores deltas until the relay is notified that the remote network-capable device has reconnected to the network, and then the relay sends the deltas to the reconnected remote network-capable device.

34 Claims, 12 Drawing Sheets

U.S. PATENT DOCUMENTS

| | | | | |
|---|---|---|---|---|
| 5,862,346 | A | * 1/1999 | Kley et al. | 709/201 |
| 5,892,949 | A | 4/1999 | Noble | |
| 5,899,810 | A | 5/1999 | Smith | |
| 5,966,512 | A | * 10/1999 | Bates et al. | 709/201 |
| 5,987,376 | A | * 11/1999 | Olson et al. | 709/201 |
| 6,105,055 | A | * 8/2000 | Pizano et al. | 709/204 |
| 6,151,621 | A | * 11/2000 | Colyer et al. | 709/204 |
| 6,233,600 | B1 | * 5/2001 | Salas et al. | 709/201 |
| 6,342,906 | B1 | * 1/2002 | Kumar et al. | 345/751 |
| 6,353,174 | B1 | * 3/2002 | Schmidt et al. | 709/201 |
| 6,411,988 | B1 | * 6/2002 | Tafoya et al. | 709/204 |

FOREIGN PATENT DOCUMENTS

| | | |
|---|---|---|
| WO | WO 94/19751 | 9/1994 |
| WO | WO 94/19751 A1 | 9/1994 |
| WO | WO94/19751 A1 | 9/1994 |
| WO | WO 98/38594 | 9/1998 |
| WO | WO 98/38594 A1 | 9/1998 |
| WO | WO98/38594 A1 | 9/1998 |
| WO | WO 99/06925 | 2/1999 |
| WO | WO99/06925 A1 | 2/1999 |
| WO | WO 99/06925 A1 | 2/1999 |

OTHER PUBLICATIONS

Begole, James "Bo", "Flexible Collaboration Transparency", Department of Computer Science, Virginia Tech, May 12, 1997, p. 1–30, Internet address http://simon.cs.vt-.edu/~begolej/Papers/Prelim/FlexibleCollabTrans.pdf0.

Yang, Y., et al., "A Web–Based Synchronous Cooperative Editor for Software Development", ICSE–98 Workshop on Software Engineering over Internet address www3.cm.deakin.edu.au/~yun/ICSE–W98/editor/index.htm, 1998.

Berglund, et al.; Amaze: A Multiplayer Computer Game; IEEE Software; May 2, 1985; p. 30–39; New York, New York.

Broll, Wolfgang, "Distributed Virtual Reality for Everyone –A Framework for Networked VR on the Internet", GMD –German National Research Center for Information Technology, Institute for Applied Information Technology, Sankt Augustin, Germany, 1997 IEEE, pp. 121–128.

Palfreyman, Kevin, et al., "A Protocol for User Awareness on the World Wide Web", Lancaster University, www.comp.lancs.ac.uk/computing/users/kev/computing/project.

Mansfield, Tim, et al., "Evolving Orbit: A Progress Report on Building Locales", Cooperative Research Centre for Distributed Systems, Technology and School of Information Technology, www.dstc.edu.au/TU/Worlds/.

* cited by examiner

METHOD AND APPARATUS FOR ACTIVITY-BASED COLLABORATION BY A COMPUTER SYSTEM EQUIPPED WITH A COMMUNICATIONS MANAGER

CROSS REFERENCE TO RELATED APPLICATIONS

The following co-pending, commonly-assigned U.S. patent applications are related to the present application, and incorporated by reference herein in their entirety:

Ser. No. 09/356,930, entitled "Method and Apparatus for Activity-Based Collaboration by a Computer System Equipped with a Dynamics Manager," filed on even date herewith by Jack Ozzie, et al.

Ser. No. 09/356,148, entitled "Method and Apparatus for Prioritizing Data Change Requests and Maintaining Data Consistency in a Distributed Computer System Equipped for Activity-Based Collaboration", filed on even date herewith by Jack Ozzie.

FIELD OF THE INVENTION

The invention relates generally to computers interconnected for communication over a network such as the Internet and intranets, and more particularly to a distributed computer-based system for coordinating and otherwise maintaining data pursuant to a distributed data model.

BACKGROUND OF THE INVENTION

The Internet has established a dynamic, public environment for communication and interaction among its millions of users. In business, the Internet has redefined vendor-manufacturer, manufacturer-distributor, distributor-customer, and other relationships. With extension of the Internet technology into internal, secured networks of individual companies, the "intranet" or "private Internet", as it is called, has enabled new forms of document and information sharing between individual employees and work groups using company directory and network infrastructure. Online services, such as electronic bulletin boards and chat rooms, electronic commerce, and technical support for products, are available on the World Wide Web ("WWW" or "Web") operating over the Internet.

The Internet has, at its core, a server-client architecture, in which individual clients (i.e., Internet-content users) interface via computer-executable applications such as browsers with servers (i.e., Internet-content providers) to obtain documents from Web sites. Browsers are software programs that enable personal computers to request, receive (e.g., download), interpret, and present Internet documents, and generally navigate the Internet. Web servers typically have standard interfaces for running external programs, the most common is the Common Gateway Interface (CGI). Web sites are collections of documents, usually consisting of a home page and related, linked documents, located on servers remote from the client. The documents can be compound documents, containing data, graphics, video, sound, and/or other types of media, as well as links to other documents. Essentially, the WWW is a web of interconnected documents, or, more precisely, document objects that are located at various sites on the Internet.

Among the types of document objects on the WWW are documents and scripts. A script is an executable program, or a set of commands stored in a file, that can be run by a Web server to produce a document that is then returned to the Web browser. Typical script actions include running library routines or other applications to get information from a file or database, or initiating a request to get information from another computer, or retrieving a document corresponding to a selected hypertext link. A script is run on the Web server when, for example, a user selects a particular hypertext link in the Web browser.

Underlying the Internet technology are advances in standardization, including personal computer hardware, software, network protocols, and infrastructural conventions (such as the "Uniform Resource Locator" or "URL"). URLs provide location addresses for all document objects on the WWW. A URL uniquely references a document object and often defines an access algorithm using Internet protocols.

"Internet protocols", as that expression is used herein, are defined as current or future language conventions and present or future communication protocols that are generally-accepted and used for generating messages including documents for transmission over the Internet, or for transmitting such messages over the Internet, respectively. Such language conventions include, for example, at present, Hypertext Markup Language ("HTML") and eXtensible Markup Language ("XML"). Such communication protocols include, for example, at present, Hypertext Transfer Protocol ("HTTP"), TCP/IP, FTP, GOPHER, NetB/os, SPX/IPX™ and AppleTalk™. A primary requirement of the communication protocol is that it supports the establishment of reliable or unreliable directed sessions between addressable network devices. Those skilled in the art will be familiar with these language conventions and protocols.

HTML is a language used for writing hypertext documents, containing multimedia content and links to other documents. An HTML document includes a hierarchical set of markup elements, where most elements have a start tag, followed by content, followed by an end tag. Tags are enclosed in angle brackets ("<" and ">") and indicate how the document is structured and how to display the document, as well as destinations and labels for hypertext links. There are tags for markup elements such as titles, headers, text attributes such as bold and italic, lists, paragraph boundaries, external links to other documents, and internal links to other parts of the same document, graphic images, and many other document features. Many books are in wide circulation regarding programming using HTML.

XML is another of the language conventions included in the Internet protocols. XML is compatible with and complementary to HTML, at least in its current version. It is a standard way of describing a class of data objects as stored in computers, called XML documents, and behavior of programs that process these objects. XML documents are made up of storage units called entities, which contain either text or binary data. Text is made up of characters, some of which form the character content of the documents, and some of which forth markup. Markup encodes a description of the document, such as its storage layout and logical structure. A software module called an XML processor is used to read XML documents and provide access to their content and structure. Further information regarding XML can be had with reference to Version 1.0 of the XML specification, available at <HTTP://www.w3.org/XML>, and incorporated herein by reference.

A Web server and a Web browser communicate typically using the HTTP message protocol and the underlying TCP/IP data transport protocol of the Internet. In HTTP, the Web browser establishes a connection to a Web server and sends an HTTP request message to the server. In response to the request message, the Web server checks authorization, performs any requested action such as downloading a document identified by its URL, and returns an HTTP response message containing either the HTML document resulting from the requested action or an error message. The returned document may simply be a static file stored on the Web server, or it may be generated dynamically using a script called in response to the request message.

Networks using the TCP/IP protocol route messages based on Internet Protocol (IP) addresses of the destination devices. The IP addresses comply with a specified format, currently including a 32-bit numeric address written as four numbers separated by periods. Each device on a network has a unique IP address used for communication over the network. The term "IP address" as used hereinbelow is intended, depending on context, to encompass addressing in compliance with current or future Internet protocols.

To take advantage of the Internet, tools and resources have been developed in compliance with the Internet protocols, including company-critical applications such as e-mail. E-mail is electronic mail, by means of which documents are sent and, received electronically at selected addresses. It has been estimated that a vast majority of Internet-based interaction is through the use of e-mail and other browser-based media that follow a "document send and receive" model. Perhaps due to that model, users often view the Internet as inherently "peer-to-peer", with individuals accessing documents provided by other individuals, without intervention by a higher authority.

The Internet is dynamic and flexible in providing users with entertaining and useful ways of communicating, though it does not meet all the needs of users. While users interact increasingly through the Internet, they continue to interact "off" of the Internet in more conventional ways, such as through multi-medium (phone, fax, whiteboard), multi-temporal (real-time, overnight mail) and other informal means of communication.

It would be desirable to extend the Internet paradigm to personal and private communications and other shared and mutual activities between individuals and small groups in shared private spaces. Such interactions should preferably occur instantly, directly, and confidentially between participants' personal computers, or other network-capable devices, without exposing such interactions to server bottlenecks through which Internet traffic is typically funneled to third-party Web sites where communications can be intercepted and confidences violated.

It would also be desirable to provide a technique that allows users at various remote sites to share and edit documents on a peer-to-peer basis, while maintaining consistent copies of the documents at local sites. Such a technique should permit any of the users to issue change requests regarding the documents, which changes can then be made asynchronously to the copies at all the local sites in a coordinated fashion even if the sites are disconnected from the network when the change requests are issued.

SUMMARY OF THE INVENTION

The invention resides in an apparatus called an activity, which is operable in a personal computer system, communication appliance or other network-capable device, for performing a shared, focused task with other, remotely-located users, such as, for example, a "chat", gaming, or business application. The activity includes a tool for causing generation of data change requests, called deltas, responsive to user interactions. The activity also has a data-change engine for maintaining data in preferably non-volatile, persistent memory pursuant to a data model. The data-change engine includes a tool end for receiving deltas from the tool, providing the deltas with activity-specific commands for carrying out the request, and providing notification to the tool of data changes caused by delta execution. The data-change engine also includes a dynamics manager end for receiving, from a dynamics manager, data-change directions to execute the deltas, i.e., perform the deltas' commands to make the requested changes to the data.

In another aspect, the invention resides in a system for providing communications and other shared and mutual activities between individuals and small groups in shared private spaces, called "telespaces". In the system, participants or members of a telespace interact through network-capable devices, which can communicate with one-another over a network, e.g., the Internet or an intranet, and store individually local copies of telespace data. Each telespace is an instantiation of one or more activities operable on each of the network-capable devices of members of the telespace. Each activity:includes one or more tools for initiating data change requests or deltas responsive to telespace member interactions. Each activity also includes one or more data-change engines, separate from the tools, for maintaining the local copy of telespace data pursuant to a common data model. The data model is, for example, activity-specific, and preferably telespace-wide. Each network-capable device also includes a dynamics manager for locally generating deltas, for, responsive to the deltas, directing the data-change engine to execute the deltas by making the requested changes to the local copy of data, and for coordinating the execution of deltas from the various network-capable devices.

In yet another aspect, the invention can be practiced in a networked system including plural, preferably network-capable devices at different locations connected for communication preferably in accordance with Internet protocols. Each network-capable device has (a) a memory for storing a local copy of activity-related data pursuant to a common data model, (b) one or more activities each including one or more tools and corresponding data-change engines as described above, (c) a communications manager for causing deltas to be shared among all the network-capable devices of the networked system that participate in the telespace to which the deltas pertain; and (d) a dynamics manager for coordinating execution of both locally-generated and remotely-generated deltas. The user interactions can be initiated, and the resulting deltas generated, at any of the network-capable devices of the networked system, and the deltas are transmitted to each of the devices preferably over the network. The dynamics managers direct the operation of their local data-change engines, preferably to prioritize execution of deltas and to maintain substantial consistency of the data across the networked system. The networked system thus allows users at various remote sites, e.g., to share and edit data or perform other activities independently, on a peer-to-peer basis, while maintaining substantially consistent copies of the data at each of the network-capable devices for use even when disconnected from the network.

In still another aspect, the invention can be implemented as an activity-based collaboration (ABC) system for interpersonal interaction. The ABC system includes plural, network-capable devices connectable, e.g., via public networks (e.g., the Internet or wide area networks (WANs)) or via private networks (e.g., local area networks (LANs) or intranets), by cable, fiberoptics, infrared (IR) or other forms of communication links, to form the above-described networked system. Each network-capable device is equipped with the above-described memory, and a framework including one or more dynamics managers. The network-capable devices are preferably plug-compatible with the public network infrastructure, personal desktop applications and infrastructure (sometimes called "personal Internets"), and, where applicable, a company intranet. The ABC system preferably uses dynamic, snap-in activity components, each for performing a specific task, such as "chat", document editing, gaming, etc. The activity components can comprise software made available, for example, as shrink-wrapped products or downloaded over the network, e.g., the Internet. The activity components can operate through common application programming interfaces (API) with the framework. Accordingly, the framework can be viewed and function as a platform for applications in the form of the activity components.

Yet another aspect of the invention resides in the framework further including a communications manager operable on a local network capable device for sending locally-generated deltas to remote network-capable devices and for receiving remotely-generated deltas from the remote network-capable devices. The communications manager can selectively send the local deltas either directly to the remote network-capable devices, e.g., at their respective URLs, or to a "store and forward" relay, e.g., at its URL, in response to network connection status information regarding the remote network-capable device. The network connection status information can include connectability information maintained by the communications manager, including, e.g., information regarding communication protocol compatibility, security issues (e.g., firewalls) that may render the remote device unreachable by the local device. The connection status information can also include information maintained by a presence mechanism, such as a presence server, regarding the online/offline status of the remote device. The presence server can be part of the ABC system, and, e.g., responsible for sending the online/offline status information over the network to the communications manager. In situations where the remote network-capable device is temporarily not connected to the network ("offline"), the relay can store the deltas until notified that the remote network-capable device has reconnected to the network, and then send the deltas to the reconnected remote network-capable device. For receipt of deltas from the remote network-capable devices, the communications manager sends an online/offline status notification to the presence server indicating whether the local network-capable device is connected to the network ("online") and therefore capable of receipt of deltas from remote devices.

Thus, the invention can be implemented as separate commercial products and services, including provision of the individual activity components, the framework for individual network-capable devices, and/or networked or ABC system, as well as communication services for effecting interactions between devices forming the system.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

A. Terminology

Figure 1:
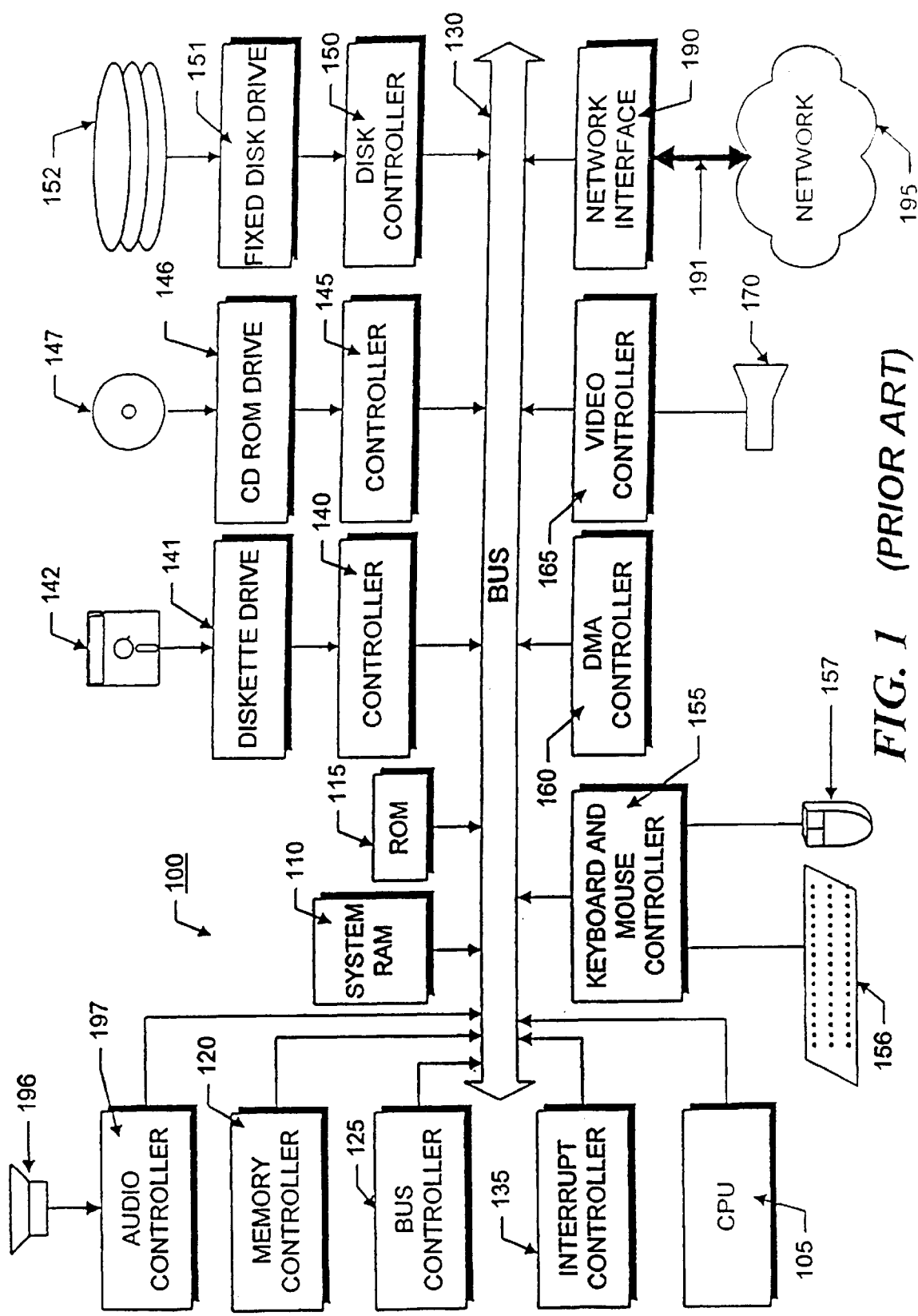
FIG. 1 is a block diagram of an illustrative architecture of a conventional computer system.

It may prove useful to introduce at the outset certain terminology and abbreviations used in this specification, including: activity, client, communications manager, component, controller, delta, device, dynamics manager, engine, framework, identity, member, navigation, person, server, telespace, tool, URL, and XML.

"Activity" refers to what a user actually does with the ABC system in order to interact with other users. The term "activity" can have either of two meanings, depending on context. From an "outside view," it means a runtime interaction between the ABC system and a computer user; e.g., an activity of this type permits users to draw on a shared whiteboard or permits two or more users to chat in real-time. An activity in this sense can also be a background service (i.e., agent) running on a user's behalf on a local or server device, such as an archive server agent, or an inbound FAX agent. From an "inside view" of a software designer, "activity" means a modular, computer-executable program that can run on a user's personal computer or other form of device and perform a focused task. An activity in this sense is comprised of two types of components, a tool and an engine, which are combined at design time to create an "activity template". An activity template can be distributed in many ways, for example, as shrink-wrapped software or software that can be downloaded off the Web. It is envisioned that widely-distributed programs used for word-processing, spread-sheets, etc. will have versions designed for use in the ABC system, and sold as such in activity template form conforming to ABC system programmer interfaces.

"Client" refers to a user's personal computer, communication appliance or other form of device that is capable of human interaction, and connectable to a network, e.g., the Internet. Background programs that run on the user's personal computer are called "Client Service Controllers". Foreground user interface (Ul) programs that run on the user's personal computer are called "Client Ul Controllers".

"Communications Manager" refers to a mechanism for directing inbound and outbound deltas to appropriate destinations. The communications manager can be implemented, for example, as a computer-executable program, which directs locally-initiated deltas created by a tool/engine pair for transmission over a network, e.g., the Internet, to another remote personal computer or other form of network-capable device, or to a relay. The communications manager directs such deltas to a relay, e.g., when that remote device is not connected to the network, or to make better use of network bandwidth or for efficiency in communication (e.g., fanout or routing). The communications manager directs remotely-generated deltas received over a network, e.g., Internet, to a dynamics manager.

"Component" refers to a computer-executable program and its resources used within an activity. All components are identified by URLs. It is envisioned that the Web can be a global repository for components, with versions securely downloadable onto an appropriate component platform in the ABC system.

"Computer" refers to a device, as that term is defined hereinbelow.

"Controller" refers to a top-level, computer-executable program that drives the "inner" functionality of the ABC system. A controller is tuned for a given platform, for example, a UNIX™ Daemon controller, or a controller for Microsoft Windows™ running on an Intel™ microprocessor-based computer system. Two general types of controllers are a service controller, which runs as a background process generally invisible to users, and a user interface (Ul) controller, which is interactively controlled by a user.

"Delta" refers to a self-contained unit of data that contains one or more tool-to-engine data change requests (i.e., notifications or prompts regarding desired changes to the data). Tools initiate delta creation by the dynamics manager in response to user interaction, and submit them to engines for asynchronous execution, as described below, under the direction of a dynamics manager. A delta has a specific format, including a header portion for providing control information and a payload portion for providing information regarding the data to which the request pertains. An individual delta can have one or more payloads, and where multiple payloads are employed, each can be targeted to telespace members with unique device capabilities or user roles. Tools request information regarding potential data changes from engines for display or other form of presentation to users, and are asynchronously notified when deltas cause display changes.

"Device" refers to a physical hardware device, such as a personal computer or communication appliance, which, for purposes hereof, unless the context indicates otherwise, is typically network-capable, i.e., can communicate with other network-capable devices over the network, e.g. the Internet using Internet protocols. All devices are assigned a unique identity code by the ABC system, have URLs, and are distinct from the persons using the devices. A device potentially hosts many telespaces.

"Dynamics manager" refers to the part of the framework of the ABC system, which facilitates the creation and coordinates the execution of deltas. The dynamics manager can be implemented, for example, as a computer-executable program that runs on a user's personal computer or other form of network-capable device.

"Endpoint" refers to a unique pairing of a device and a person. The ABC system uses this concept as a method of uniquely distinguishing a person among multiple users of a device, or devices among multiple computers used by the same person.

"Engine" refers to what can be called the "bottom half" of an activity that implements the management and modification of persistent storage and data structures within the ABC system. Engines are packaged as components, have no user interfaces themselves but rather depend on their corresponding tools for user interfaces, and are substantially portable. Engines preferably exist exclusively to serve their corresponding tools. Engines preferably operate in universal synchrony.

"Framework" refers to the "inner workings" of the ABC system and contains most of its subsystems, including the dynamics manager, but no user interface. The framework is a computer-executable program that can run on a user's personal computer or other form of network-capable device, and sits logically between the high-level controllers and the activities.

"Identity" is generally synonymous with "person", though generally refers to one of the names, represented by an URL, by which a person is known by others. This concept comes into play because the ABC system embraces the notion that a person may have many identities or aliases, and, for example, many different URLs.

"Member" refers to a participant within or subscriber to a telespace, and is generally synonymous with the person portion (as opposed to device portion) of an endpoint when referring to telespace membership.

"Navigation" refers to the act of moving between URLs, and is analogous in the ABC system to navigation between Web pages and sites by a Web browser.

"Person" refers to a human being, or a server acting as a human's proxy, and generally refers to one who is participating in activities within a telespace. Each person has one or more identities, each of which is uniquely identified with an URL.

"Relay" refers to a device, e.g., a server, that securely and reliably stores-and-forwards and, in some applications, can perform multicast fan-outs of messages. The body of the transferred message is unknown to the relay, and, e.g., is a delta. A relay can provide device presence information and perform administrative functions in some embodiments of the invention.

"Server" refers to a device that is normally incapable of direct human interaction except over a communication channel and can only run as background programs under service controllers.

"Telespace" refers to a virtual place were people gather to participate in one or more activities, and where people share things. The telespaces and the results of activities are persistently stored in memories on users' personal computers or other forms of network-capable devices. A telespace is generally kept in synchrony between a user's device and other peoples' devices. A telespace represents the logical unit of "membership" and access to activities. A telespace is an instantiation of one or more activities.

"Tool" refers to what can be called the "top half" of an activity that implements the activity's user interfaces. Tools are packaged as components, initiate delta creation in response to user gestures, and interact with corresponding engines of the individual activities to perform specific tasks.

"URL" is an abbreviation for universal resource locator, which is a unique structured address of a resource such as a document, and, in some instances, represents a method by which a resource should be handled. URLs are used herein for substantially all persistent objects, user-visible objects, and external program-visible objects.

"XML", as noted above, is an abbreviation for extended Markup Language, which is a standard, structured data format derivative of SGML intended for use on the Web. Depending on the context it also refers to an in-memory object structure used in the ABC system, which is compliant with the XML standard's semantics. Many XML concepts are used herein, such as "documents", "elements", "tags", "attributes", "values", "content", "entities", "links", and "pointers". XML is used herein, for example, for structuring data in a document.

B. Conventional Computer System

FIG. 1 illustrates a conventional system architecture for an exemplary computer system 100, with which the disclosed invention can be implemented. The exemplary computer system of FIG. 1 is discussed only for descriptive purposes, however, and should not be considered a limitation of the invention. The invention is further not limited to devices traditionally thought of as computer systems, since it may be implemented in any of various types of network-capable devices, including, e.g., video game consoles, personal appliances or cable set-top boxes. Although the description below may refer to terms commonly used in describing particular computer systems, the described concepts apply equally to other computer systems, including systems having architectures that are dissimilar to that shown in FIG. 1. For example, cable set-top boxes may not contain mass storage but do contain video tuners built with digital signal processors.

The computer system 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the computer system 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Computer system 100 also includes a network adapter 190 that allows the client computer 100 to be interconnected to a network 195 via a bus 191. The network 195, which may be a local area network (LAN), a wide area network (WAN), or the Internet, may utilize general-purpose communication lines that interconnect multiple network devices.

Computer system 100 generally is controlled and coordinated by operating system software. Among other computer system control functions, the operating system controls allocation of system resources and performs tasks such as process scheduling, memory management, networking and I/O services.

C. Conventional Approach to Controlling a Data Model

Figure 2:
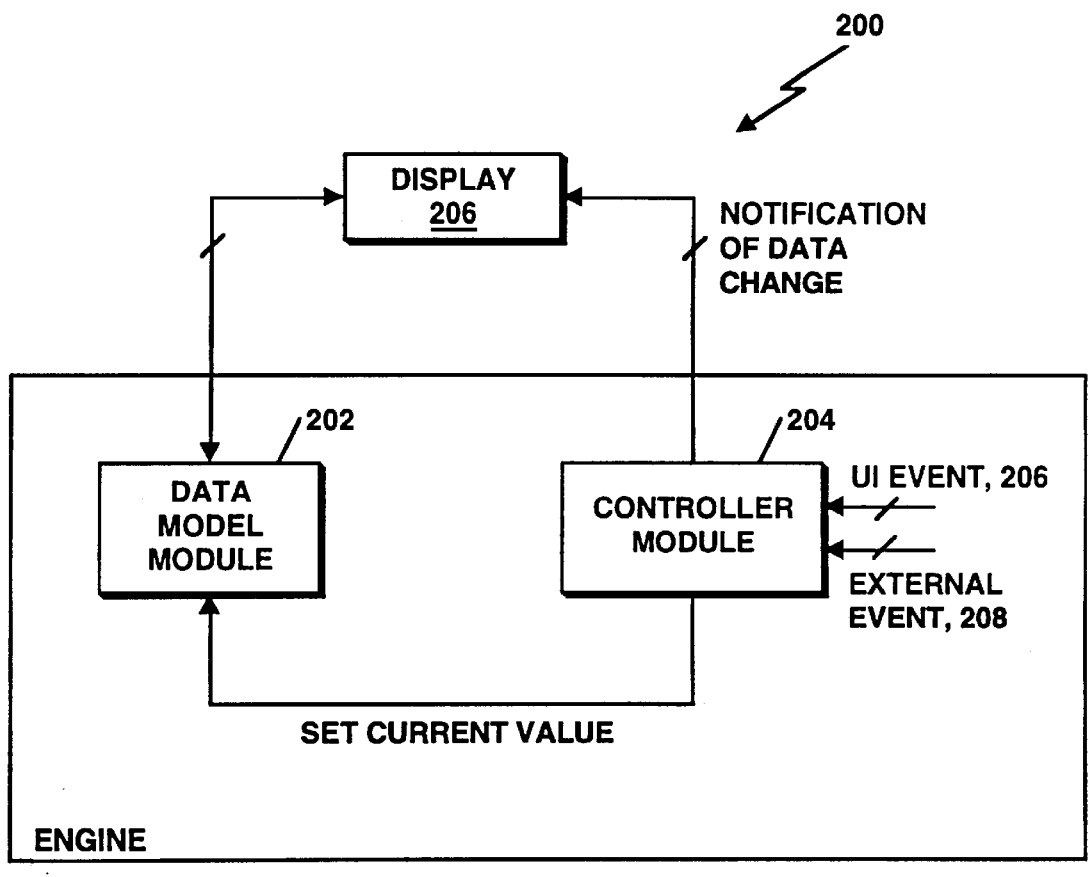
FIG. 2 is a block diagram of a conventional application run on the computer system of FIG. 1, in which a control module is responsible for both interfacing with a display or other user interface and for maintaining data in accordance with a data model.

FIG. 2 shows a conventional system 200 for controlling a data model using a technique known as "model view controller". In system 200, a data model module 202 stores and maintains data, for example a database, in accordance with a data model. A controller module 204, responsive to a locally initiated event 206 (such as a user input) or to an externally initiated event 208 (such as event notifications received from remote computer systems), directs a "set current value" command to the data model module 202 to cause a change in the stored data. The controller module 204 notifies an output device such as display 206 of the data change. The display 206 obtains the changed data from the data model module 202 and updates the display of the data so that the current data can be viewed by a user. The foregoing technique is strictly event driven and linear in operation. Typically, internal or external events that cause the controller module 204 to command a change to the data are stored in a FIFO (first-in, first-out) buffer in the controller module 204, and then handled in the order in which the event notification reaches the controller module. Typically, also, no provision is made in system 200 for global consistency issues, that is, for assuring that copies of the model data in the system 200 are consistent with data in other remote systems.

The conventional approach for controlling a data model as exemplified in the system 200 was appropriate in an age in which computer systems, whether mainframes or personal computers, operated in relative isolation. With the advent of the Internet, computer users demand improved ways of collaborating, and the invention provides what can be called "model mediated control", in which a dynamics manager mediates changes effected by the data-change engine to the data model.

D. Internet Paradigm for Intercomputer Operation

Figure 3:
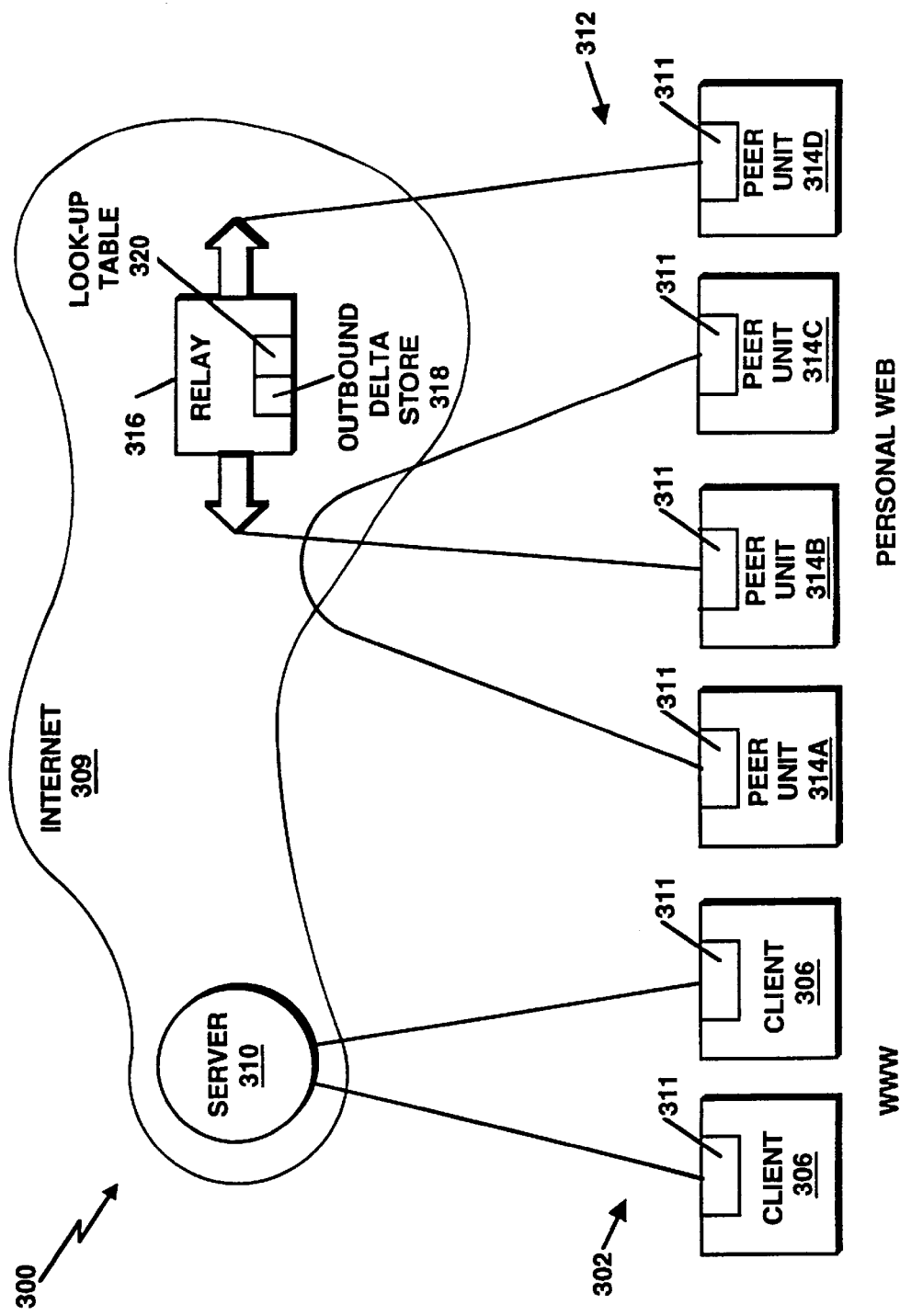
FIG. 3 is a block diagram of an Internet-based system, showing both a client-server system for the WWW and a peer-to-peer system for a personal Web in accordance with an embodiment of the invention.

FIG. 3 illustrates an Internet environment 300, in which the present invention can be advantageously employed. From the perspective of a user, in a conventional client-server view 302, individual clients 306, 308 separately communicate over the Internet 309 with a server 310. Each client 306, 308 can direct a request through the Internet 309 to the server, and, responsively, the server 310 may respond to the request, for example, by providing documents stored on the server over the Internet 309 to the clients. Each server 310 and client 306, 308 can be implemented as a personal computer as illustrated in FIG. 1 (with certain UI components optional in the case of the server), capable of execution of appropriate programs such as a client browser 311 and/or other communication interface, as described below. In a peer-to-peer view 312 of Internet use, the users' computer systems constitute peer units 314A–D, and communications through the Internet can be directed from one peer unit to another, without apparent intermediaries. Each peer unit 314A–D can be implemented as a personal computer such as that illustrated in FIG. 1 or other form of network-capable device. The invention can be implemented advantageously in either clients 306, 308, or peer units, 314A–D, though that description will focus on implementation with a peer-to-peer view of the system.

As will be explained in more detail below, such peer-to-peer communications can be made directly or via a relay device 316. The relay device 316 is preferably a "store and forward", which can store messages destined to a peer unit 314 which is temporarily disconnected from the Internet, and later, on reconnection, can forward the messages to that peer unit. The relay device 316 can also be used to make better use of network bandwidth.

E. ABC system Architecture and Operation

Figure 4:
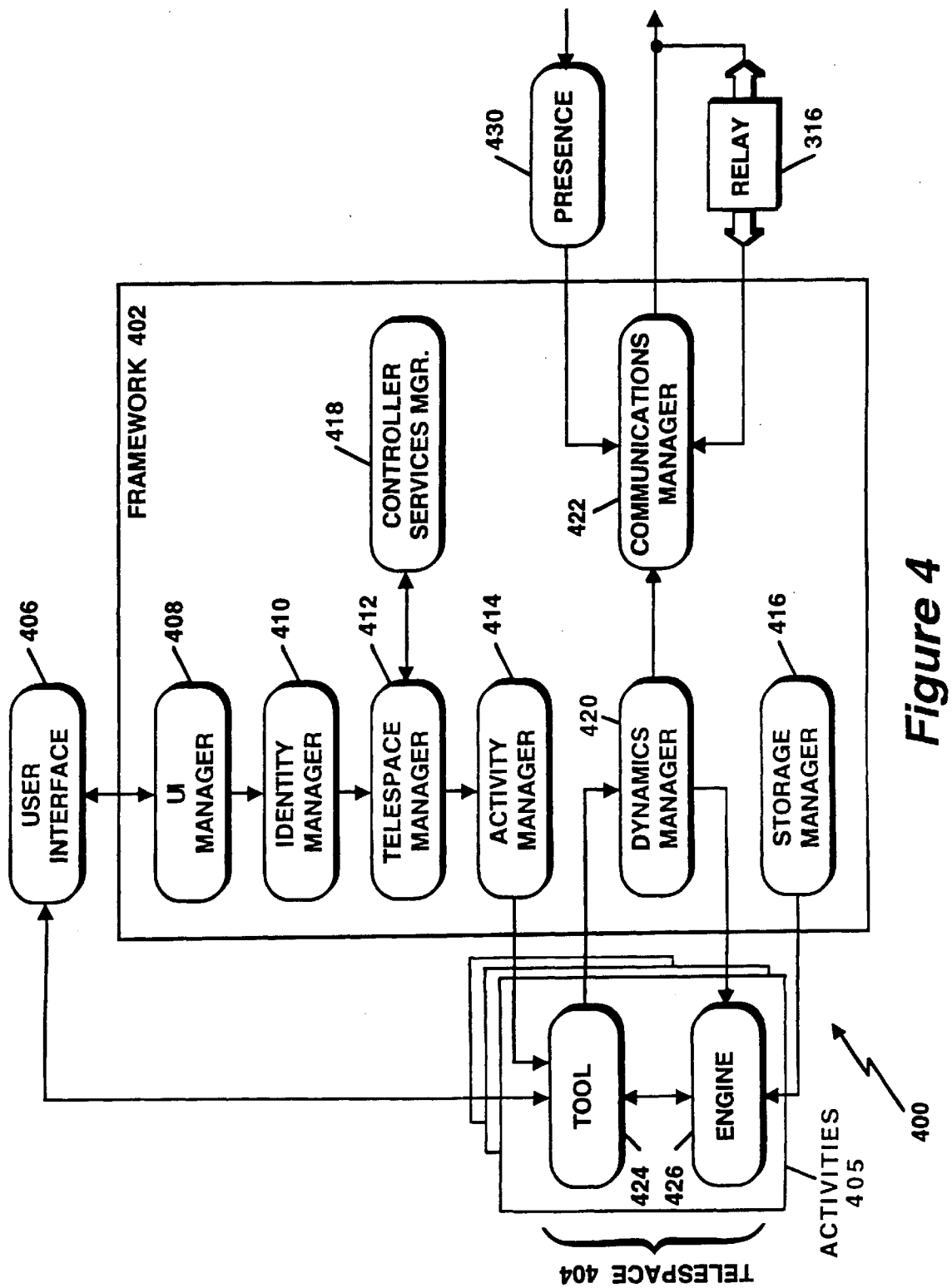
FIG. 4 is a block diagram of a portion of ABC system as implemented on the computer system of FIG. 1 in accordance with an embodiment of the invention.

FIG. 4 shows the ABC system 400 as implemented on one of the peer units 314A–D, such as, for example, peer unit 314A. The ABC system on peer unit 314A has a framework 402, at least one telespace 404, and a user interface 406. The framework 402 preferably provides a platform for servicing a number of telespaces 404. The framework 402 preferably is of modular construction, with a programmer interface on which the activities run and through which they communicate with framework components.

The framework 402 includes a user interface manager 408, identity manager 410, telespace manager 412, activity manager 414, storage manager 416, controller services manager 418, dynamics manager 420, and communications manager 422.

The user interface (UI) manager 408 is responsible for managing shared services for a number of user interface controllers (not separately shown). The Ul manager 408 manages layout of activities within panes of a display window, and otherwise provides a desired "look and feel" for the user interface. The UI manager 408 also manages activity navigation (for example, go to, next, previous, etc.) and maintains a navigation history.

The identity manager. 410 is responsible for maintaining identities of a telespace's member. As noted above, an identity is the name, and corresponding URL, by which each user is known by others. Individual users may have one or many identities. The identity manager 410 maintains a record or table, preferably in XML, of the identities. The identify manager 410 can also maintain a record or table, preferable in XML, of the URL's of telespace members and their corresponding device URL's, or a separate member manager can be used.

The telespace manager 412 is responsible for managing each of the telespaces 404 that may be opened on the peer unit 314A. Each telespace 404 is an instantiation of one or more activities. Each telespace 404 has a corresponding activity manager 414.

The activity manager 414 is responsible for (a) adding new activities to a telespace, (b) opening existing activities in a telespace, and (c) updating telespace activities from new activity template versions. To add a new activity, the activity manager 414 is provided with the URL of an activity template, opens the template, and extracts and propagates the template information (such as component URLs) into the telespace. The template defines the initial activity configuration for a telespace. A user may add additional activities to the telespace 404 later as needed. After being added, an activity is "part of" the telespace and visible to all telespace members. A telespace has a tag to identify its activity manager and bind the activity manager and data. Preferably, each document has a local registry linked to it, with XML tag names maintained in the registry to express mapping (reference pointers or associations) in an extensible, platform-independent way, between the document and its corresponding telespace. Each telespace member has a framework and an activity template for the telespace available on his or her peer unit 314A–D.

Each activity includes a tool, such as tool 424 and an engine, such as engine 426. The tool 424 provides the user interface (Ul) capability for the activity, interacting via Ul 406 with a member. Ul interaction may include Ul events initiated, for example, via the keyboard 156 (FIG. 1) or mouse 157 (FIG. 1). In response to such Ul events, the tool 424 may request its corresponding engine 426 to effect data model changes, subscribing to the engine 426 for asynchronous data change notifications for updating Uls asynchronously when data changes occur. A tool 424 also implements application program interfaces (APIs) for interacting with background services provided under the direction of the controller manager 418. The engine 426 is responsible for maintaining and changing the data that supports the telespace 404 and/or results from user interaction obtained through the tool. The engine 426 can modify persistent model data, and emit asynchronous data change notifications to the tool 424, both under the direction and control of the dynamics manager 420, as will be explained below. The storage manager 416 controls access to the stored data.

For creation of an activity template, a software developer may write or adapt a tool and engine for use within the framework. An activity template is a persistent representation of the tool and engine components comprising an activity. An activity template can be distributed, for example, as shrink wrapped software or downloaded, for example, over the Internet to peer unit 314A from a remote server. Activity components can be regarded as Web documents and are represented persistently via URLs. The activity template itself preferably has a URL, which allows for tracking activity design changes. The activity template can be a single activity template or an activity collection template. A single activity template pertains to only one activity, such as "chat". An activity collection template pertains to a collection of activities, such as "chat and outline".

For use, the ABC system 400 gets a member's identity via the identity manager 410, opens a telespace manager, requests the telespace manager to open a telespace via a URL, requests the telespace manager for an activity manager, and, then, the activity manager opens an activity, typically by using the activity's URL. Then, the ABC system 400 is ready for members to use the telespace to perform the shared, focused tasks offered by the particular activity.

Figure 5:
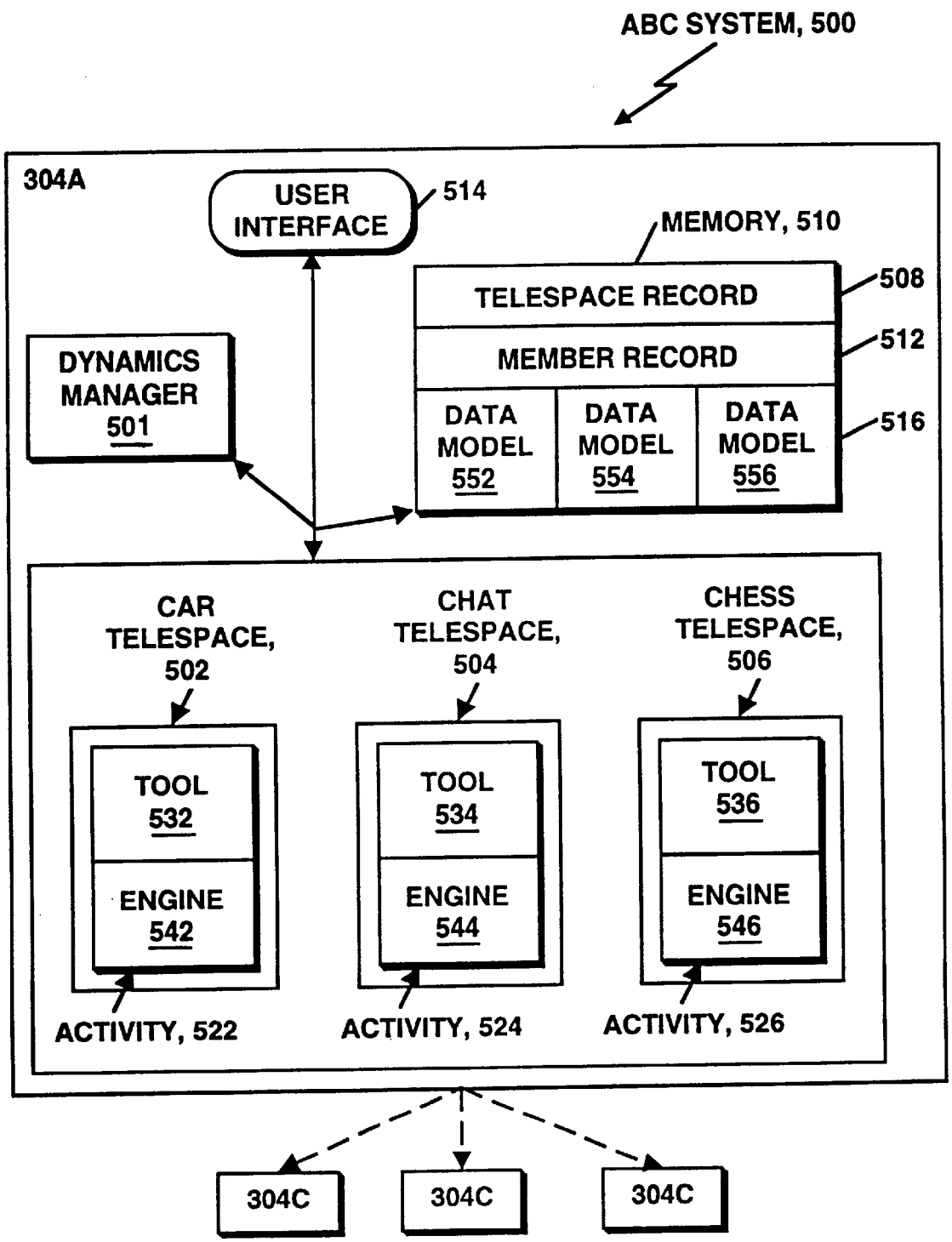
FIG. 5 is a block diagram of a portion of ABC system as implemented on the computer system of FIG. 1, and illustrating typical telespace applications in accordance with an embodiment of the invention.

FIG. 5 shows an exemplary, multi-telespace use of an ABC system 500 on peer units 314A–D. It should be understood that the ABC system 500 is a distributed system. As such while a description is provided of components only of peer unit 314A, peer units 314B–D have analogous components, and no separate description of them is necessary.

As shown for peer unit 314A, the ABC system 500 includes a number of illustrative telespaces in which peer unit 314A is subscribed as a member, including a car designing telespace 502, a chat telespace 504, and a chess playing telespace 506. As also shown, peer unit 314 has a number of components used during operation of the telespaces 502, 504, 506. Peer unit 314A has a memory 510 that maintains a telespace record 508, which lists and describes each of the telespaces 502, 504, 506 in which it is member, and a member record 512, which lists and describes each of the identities of telespace members that may participate in those telespaces. A Ul 514 can receive user-initiated changes to the telespace and member records 508, 512.

Each of the telespaces 502, 504, 506 instantiates a different one of the illustrated activities 522, 524, 526. (Alternatively, the illustrated activites 522, 524, 526 could reside in a single telespace, in which case all members of the single telespace would have access to each of the activities.) Each activity 522, 524, 526 includes a respective tool 532, 534, 536 specific to the activity, and under control of a respective engine 542, 544, 546 for carrying out changes to a corresponding data model 552, 554, 556 contained in memory 510, and which is persisted in each of the telespaces 502, 504 and 506. For example, the car design telespace 502 is an instance of an activity 522 that can include a tool 532 in the form of CAD (computer-aided design) software, and the chess-playing telespace 506 is an instance of an activity 526 that can include a tool 536 in the form of a software chess game.

Users pursue the activities 522, 524, 526 of the telespaces 502, 504, 506, via the user interface 514, which interfaces with the tools 532, 534, 536 for providing the tools with user requests. Responsive to the requests, the engines 542, 544, 546 change the persistent state of a corresponding data model 552, 554, 556 in memory 510, under the control of the dynamics manager 501 to reflect a current state. For example, the persistent state of the data for the chess-playing telespace 506 might include a chess board and locations of the chess pieces on the board; a user request may specify a chess piece move, which constitutes a change in the data, i.e., a delta; and the current state would reflect the execution of the delta and the consummation of the move.

Figure 6:
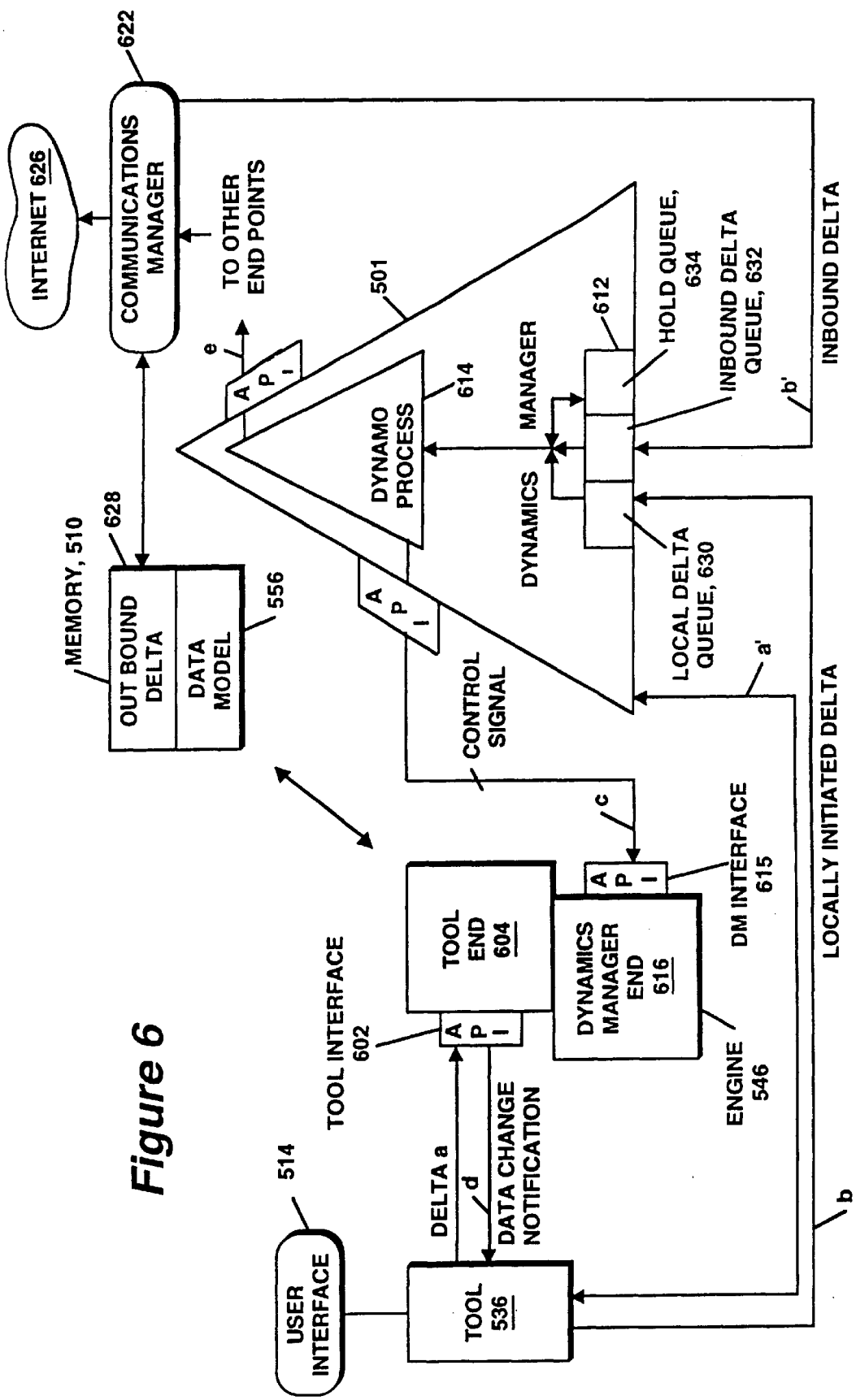
FIG. 6 is a block diagram of a portion of the ABC system as implemented for the chess telespace of FIG. 5.

FIG. 6 illustrates the operation of the ABC system 500, with reference to components thereof located in the peer unit 314A and described with respect to FIG. 5. The engine 546 presents to the tool 536 potential actions or options (e.g., chess piece moves) that can be implemented in furtherance of the particular focused task of the activity 526. The tool 536 interacts with a user who is a member of telespace 506 (as recorded in the member record 512) through the user interface 514, presenting a view of the activity (e.g., a view of the chessboard, and, possibly, a list of moves). In response to a user input, called a user gesture, (e.g., move BISHOP from X to Y) entered via the user interface 514, the tool 536 records a user selection in memory by causing a delta to be generated and stored in the system. A delta is a unit of requested change, preferably, in the form of a container object. Container objects are well known by those familiar with object-oriented programming techniques. The tool 536 is responsible for determining the granularity of the change requested in the delta. The delta container object can hold (contain) one or more commands for carrying out the change, in addition to user-specified data, e.g., an identification of a particular chess piece and the original and target locations on the board constituting a move of that chess piece. Upon generation, the delta is empty of any commands, and itself constitutes merely a request for change until filled with the appropriate commands by the engine 546 to effectuate the change. It is the responsibility of the engine 546 to record in the delta in an engine-specific way (which need not be known to the tool 536) the commands required to effect the change.

More specifically, as indicated by line "a", the tool 536 initiates creation of a delta by requesting its generation by the dynamics manager 501. The dynamics manager 501 creates the delta and returns it over lined "a" to the tool 536, and may record the created delta in case fault recovery is required.

As indicated at line "a" of FIG. 6, the tool 536 passes control of the delta through a tool interface 602 to a tool end 604 of the engine 546, thereby invoking the engine. (This description shall from time to time state that deltas are passed or that control to deltas shall pass from one component to another. Preferably, the deltas are objects allocated in memory whose pointer is passed as XML elements.) The engine's tool interface 602 exposes a set of application programming interfaces for creating commands that can effectuate the requested change encoded in the delta, or, in other words, for filling a delta with appropriate, typically engine-specific commands in serial form to fulfill the user's intent. The engine 546 then passes control of the delta, now filled with the commands, back to the tool 536.

As indicated at line "b" of FIG. 6, the tool 536 passes control of (i.e., submits) the filled delta to the dynamics manager 501 for execution. The dynamics manager 501 may also receive inbound deltas over line "b" from other peer units 314B–D. The dynamics manager 501, along with the dynamics managers in peer units 314B–D, are responsible for maintaining consistency of executed changes to the data model 556 from one end of the ABC system to the other for all members who participate in the chess game telespace.

The dynamics manager 501 includes queue structures 612 and a dynamo process 614, preferably a computer-executable program containing the main logic of the dynamics manager. The dynamics manager 501, and its dynamo process 614, are in bi-directional communication with the communications manager 622. The dynamics manager 501 enqueues the received deltas in the queue structures 612 for ordering purposes, then the dynamo process 614 services the queue structure in processing the enqueued deltas, and directing the engine 546 to execute them in an appropriate order. More specifically, the dynamo process 614 of dynamics manager 501 sends a control signal in the form of a "delta command execution" message through the interface 615 to the dynamics manager end 616 of the engine 546 over line "c" of FIG. 6. The delta command execution message directs the engine 546 to proceed with execution of the delta received from the tool 536 by making the requested change to the data model 556 contained in the memory 510, and which is persisted in the telespace.

The dynamo process 614 of dynamics manager 501 also disseminates all locally-initiated deltas to other endpoints via the communications manager 622, which transmits them over the network, e.g., 626 to the peer units 314B–D. At each peer unit 314B–D, the respective dynamics manager enqueues received deltas in its local queue structures, and then passes them in a specified order to its respective engine for execution.

A single dynamics manager can support a single telespace or multiple telespaces, depending on the application, and thus can be responsible for directing a number of engines to execute deltas for the various telespaces. In systems having multiple telespaces, as illustrated in FIG. 5, the dynamics manager 501 determines which engine should execute a delta by examining the delta's information. The delta contains commands that are identified to a specific one of the engines, and tagged with an engine identifier or code carried in the delta's payload. When the enqueued delta is processed by the dynamics manager, the dynamics manager associates the engine code with the referenced delta, and directs the delta's execution by the appropriate engine.

Finally, as indicated at line "d" of FIG. 6, the engine 546 sends a "data change notification" message to notify the tool 536 of the execution of the delta, and of a new current state of the data in the data model 556. The data change notification can be made by value or reference. That is, the notification can include the new data values themselves or can include a pointer to the new data in memory. In response to the notification, the tool 536 causes the user interface 514 to make the change available to the user, e.g., by displaying the move on a chess board graphic. If a user is viewing the display 170 (FIG. 1), the user will be able to see the change to the chess game caused by execution of the delta; otherwise, the change is effected to the data in memory 510 without the user "seeing" the change at the time it is made.

Preferably, at substantially the same time that the change is being made by engine 546 to the data model 556 stored in memory 556 of peer unit 314A, the other peer units 314B–D are making the analogous change to their locally stored data so as to effect the intent of the delta in a consistent manner. In the event any of the peer units 314A–D need to reboot, the deltas will be persisted in memory for execution after the reboot.

Situations may arise where one or another of the peer units 314A–D is not connected to the network, e.g., the Internet. Where peer unit 314A may not be connected to the network, the communications manager 622 employs a presence detector 430 to ascertain whether the peer unit 314A is connected and, if not, stores outbound deltas in an outbound delta store 628 until such time as connection is restored, and then transmits the stored deltas. Where one or more destination peer units 314B–D are disconnected from the network, the communications manager 622 of peer unit 314A can proceed to transmit the outbound delta to the relay 316 (FIG. 3) without regard to whether the destination peer units 314B–D are disconnected. The relay 316 (FIG. 3) will receive such outbound deltas, store them as necessary in an outbound delta store 318 (FIG. 3), and forward them upon the destination peer unit 314B–D being reconnected. In operation, the communications manager 622 can send all outbound deltas to the URL of the relay 316, and the relay can utilize an on-board look-up table 320 to ascertain the endpoint URL of the destination peer unit 314B–D to be used for relaying the delta. Entries in the look-up table 320 are entered when a peer unit 314 initializes, may be queried by other peer units to gather device presence information, and are removed when a peer unit 314 terminates or becomes unreachable. The relay service can be provided, in practice, by an Internet Service Provider (ISP) or other Internet organizations.

It can be seen that, as between the tool 536 and the engine 546, user interface activities are effected directly only via the tool 536 and data model changes are effected directly only via the engine 546. In the vernacular, the tool 536 "owns" the Ul and the engine 546 "owns" the data model. This can be contrasted with current, typical applications as illustrated in FIG. 2. For example, spreadsheet programs today typically combine the functions of the tool and the engine rather than separating them as in the foregoing embodiment of the invention. By separating the tool from the engine, and thus the Ul from the data model, the dynamics manager can intervene and mediate between deltas originating from the various peer units, e.g., for purposes of maintaining data consistency. The tool can be used with a variety of different engines, depending on the application, for improved flexibility and portability. Moreover, separation of the tool from the engine permits the process of execution of deltas to be carried out asynchronously. This is useful because it takes time for the dynamics manager 501 and engine 546 to carry out their responsibilities in a manner, e.g., that will maintain data consistency for all telespace members. It is also useful because inbound deltas from other peer units 314B–D can affect timing of execution of locally-initiated deltas.

Figure 7:
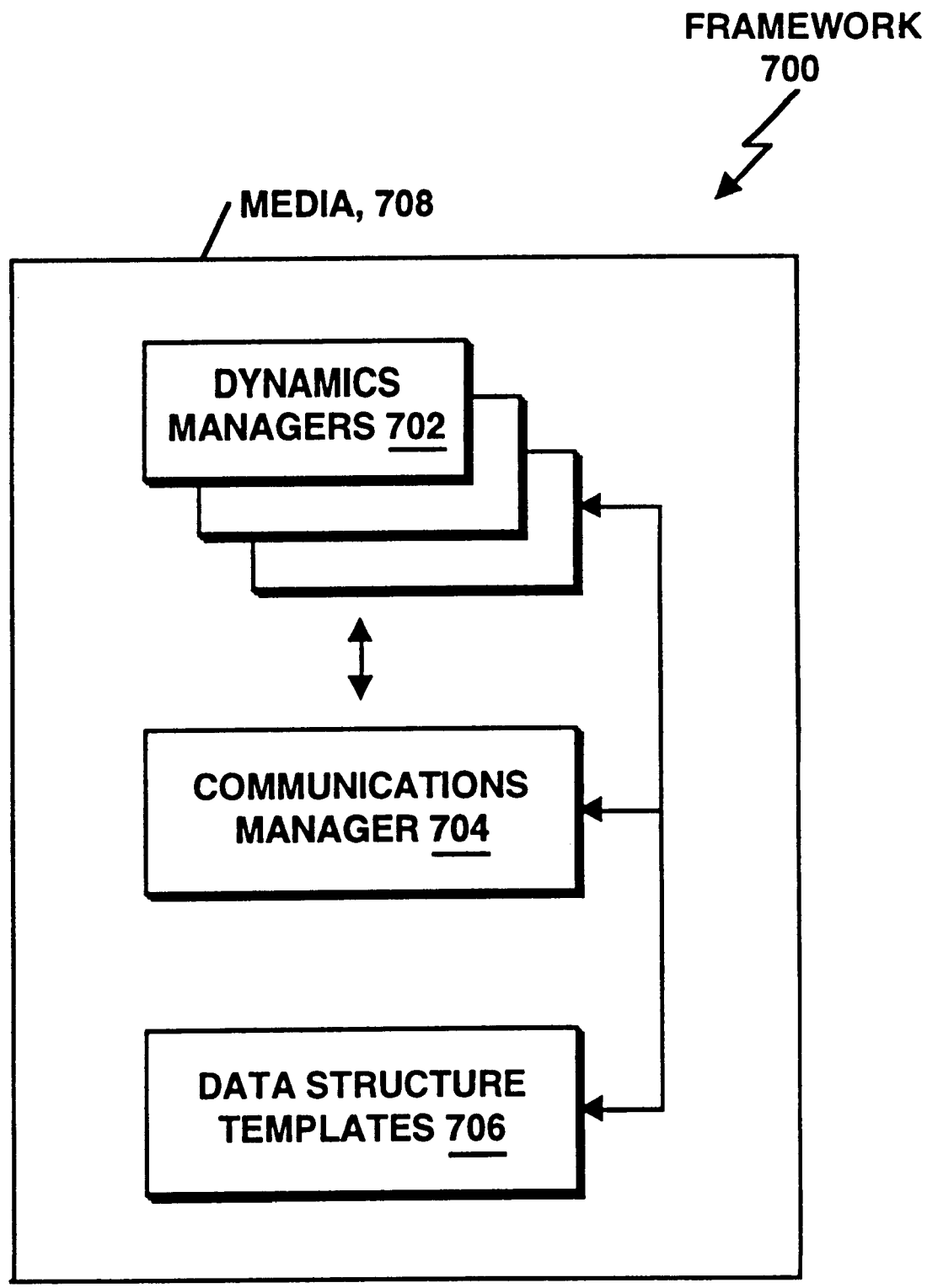
FIG. 7 is a block diagram of a framework 700 including portions of the ABC system of FIG. 4.

FIG. 7 shows an embodiment of a framework 700 for use with separately implemented activities (not shown). A framework can be sold or licensed, e.g., as a computer program product, distinct from individual activities, which may be application specific snap-ins operable over the framework. Generally speaking, the framework hosts collaborations with respect to telespaces. The illustrated framework 700 includes one or more dynamics managers 702, a communications manager 704, and a data structure template 706. The data structure template 706 can contain object primitives, preferably in XML format, for use by activity developers. The framework 700 can be implemented, for example, as computer-readable media 706, on which is stored computer-executable code comprising the dynamics managers 702 and communications manager 704, and computer readable data, including the object primitives of the data structure template 700.

F. Communications manager, Presence Server, and Relay

Figure 8:
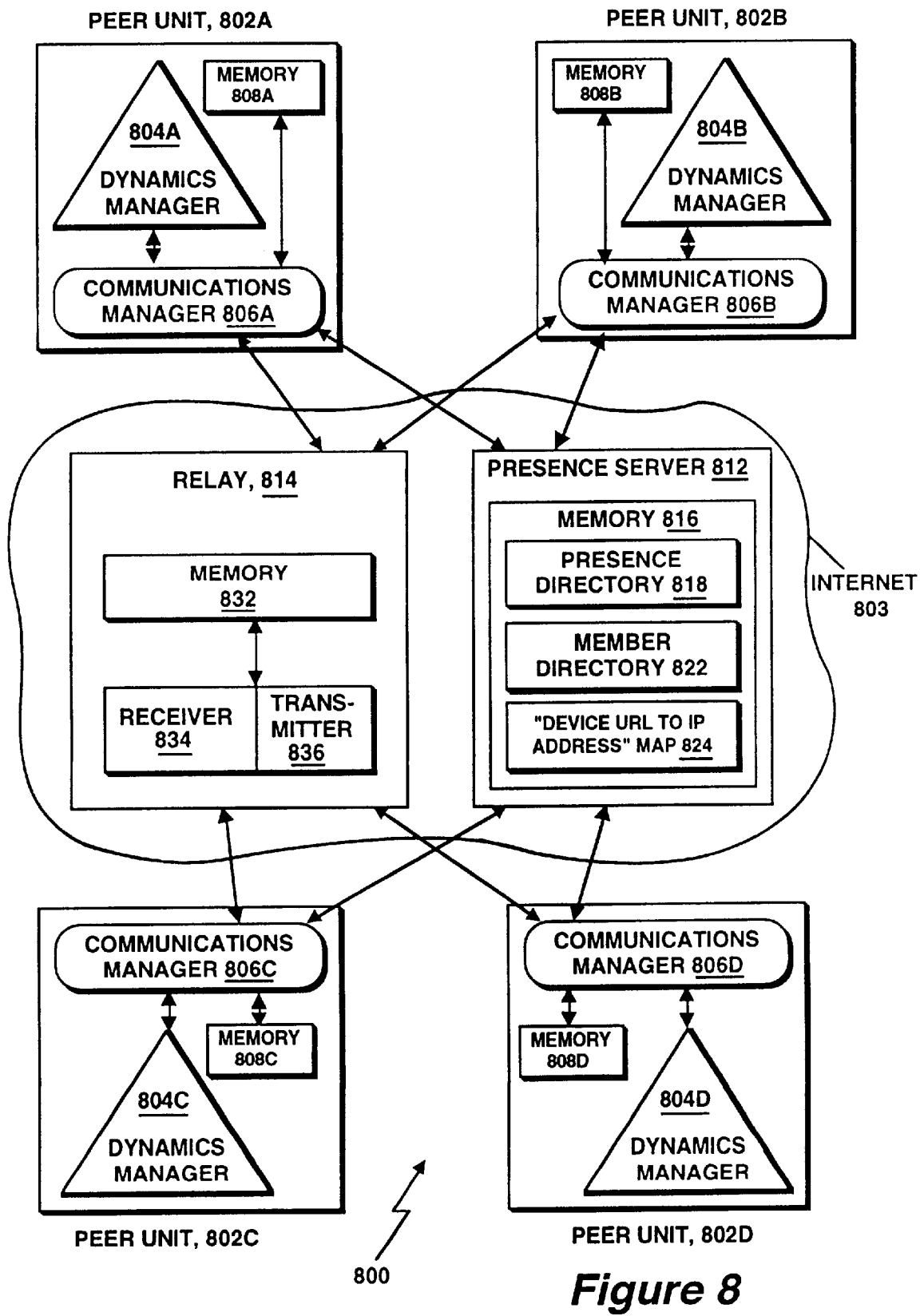
FIGS. 8 and 9 are block diagrams of an embodiment of portions of the ABC system of FIG. 4 involved in communication between peer units.

FIG. 8 shows an ABC system 800 equipped for communication between a number of peer units 802A–D via a network, e.g., Internet 803. Each peer unit 802A–D can include the components described above with respect to peer unit 314A. (The exact number of peer units shown in FIG. 8 was selected merely for illustrative purposes, and will depend on the configuration of a particular implementation and may vary over time.) Each peer unit 802A–D includes a dynamics manager 804A–D for coordinating processing of deltas, and a communications manager 806A–D for controlling communication between the peer units 802A–D. The responsibilities of the communications manager 806A–D include transmitting and receiving messages (including deltas) over the network, e.g., Internet 803 using Internet protocols, such as, for example, TCP/IP. Each peer unit 802A–D includes a memory 808A–D for storing data in support of operation, among other functions, of the communications managers 806A–D, respectively.

As noted, each communications manager 806A–D is responsible for managing all communications between its peer unit and the other peer units. For example, communications manager 806A manages bi-directional communications between peer unit 802A and peer units 802B–D. The communications can include messages sent either from the peer unit 802A to one or more of peer units 802B–D, or from one of the peer units 802B–D to peer unit 802A. The transmissions can employ unicasting (single destination, point-to-point communications), multicasting (multiple destinations with point-to-point communications), or broadcasting (transmission to all "listening" destinations) techniques. The transmissions can be made directly and without intermediaries, provided the destination peer unit(s) 802B–D (in the former case) or peer unit 802A (in the latter case) are connected to the network, e.g., the Internet ("online") and reachable by peer unit 802A. The destinations may not be reachable if, for example, they employ an incompatible communications protocol or lie behind a firewall.

As noted above, a device presence server 812 can be employed to ascertain whether the intended destination is online or offline. If the destination is offline, the communications can be made via a relay 814 (as noted above), which then forwards the message on to its destination when it returns online. The communications manager 806A is responsible for determining if the destinations are connectable or reachable, as those terms are used herein.

Thus, if peer unit 802A seeks to send a message to peer unit 802C, and the presence server 812 has informed the communications manager 806A that peer unit 802C is online, then the communications manager 806A can send the message via the network, e.g., the Internet 803, directly to the URL of peer unit 802C if that peer unit is connectable. At peer unit 802C, the message is received by communications manager 806C, which passes the message to dynamics manager 804C.

On the other hand, if peer unit 802A seeks to send a message to peer unit 802C, and the presence server 812 has informed the communications manager 806A that peer unit 802C is offline, then the communications manager 806A sends the message via the network, e.g., Internet 803, to the URL of the relay 814. The relay 814 can be implemented as a high-performance file server, which stores the en route message until peer unit 802C returns online, and then forwards the message to the URL of peer unit 802C. At peer unit 802C, the message is received as noted before, and passed through communications manager 806C to dynamics manager 804C. If both the destination peer unit 802C and the relay 814 are offline, the communications manager 806A will retry sending the message after a period of time (determined by a time-out mechanism), and, pending retry, will persist the deltas, e.g., in memory 808A, if peer unit 802A reboots or powers down.

Accordingly, the device presence server 812 can serve the purpose within the ABC system 800 of monitoring whether the peer units 802A–D are online or offline, and notifying each of the peer units of the online/offline status of the other peer units. To fulfill this purpose, the device presence server 812 can be configured, for example, as shown for computer system 100 of FIG. 1. Alternatively, the device presence server can be combined with the relay server. In such an implementation, device presence protocol functions will be performed by the relay server using the device status information in look-up table 320 rather than a separate presence directory 818.

During operation, each of the peer units 802A–D can be responsible for notifying the device presence server 812 of its online/offline status, i.e., whether it is online or about to go offline. Alternatively, the device presence server 812 can poll the peer units 802A–D from time to time to obtain their online/offline status. This information is stored in the device presence server 812 in a preferably volatile memory 816 in a presence directory 818. The device presence server 812 maintains the presence directory 818, preferably in data tree form, e.g., using XML. The presence directory 818 is initially empty, and remains so until the peer units 802A–D provide the device presence server 812 with their online/offline status, e.g., status notifications. Then, upon receipt of the status information, the presence directory 818 stores the notifying peer unit's URL and its online/offline status.

The device presence server 812 can also provide a device status subscription service for the peer units 802A–D. The device presence server 812 will notify each subscribing peer unit 802A–D of the online/offline status of each other peer unit 802A–D, and of a change in that status. The device presence server 812 can send the device status notifications to the subscribing peer units 802A–D either (a) upon request of device status change notifications from the peer unit 802A–D "wishing" to send a message; (b) upon connection of the peer unit to the network, e.g., the Internet 803; (c) from time to time, e.g., upon a change in device status of any of the peer units; or (d) a combination of the foregoing. Preferably, all communications are made pursuant to Internet protocols. These protocols can include, among others, those mentioned above.

Similarly, each peer unit 802A–D can subscribe to a user status service, e.g., with respect to each telespace in which its user is a member, and, by so doing, thereafter learn on an on-going basis of the user status of each other telespace member, e.g., whether each member is currently "logged in". To enable this service, the device presence server 812 has a telespace member directory 822 maintained in memory 816 for storing member records for each telespace supported by the presence server, and having fields for storing user status information. Alternatively, this information can be maintained within each peer unit 802A–D rather than in the device presence server 812, thus eliminating the need for a centrally located member directory 822 for providing this information.

To illustrate, if peer unit 802A wishes to send a message, such as a delta, to peer unit 802B, peer unit 802A accesses the presence server 430. The communications manager 806A of peer unit 802A will already have the URL of peer unit 802B. Peer unit 802A will use that URL of peer unit 802B to obtain the Internet Protocol (IP) address of peer unit 802B and its connection status from the device presence server 430. Then, the communications manager 806A will send the message to the IP address of peer unit 802A. Note that the dynamics manager 804A passes the message to the communications manager 806A without knowledge of whether the destination peer unit 802B is connected to the network.

Figure 9:
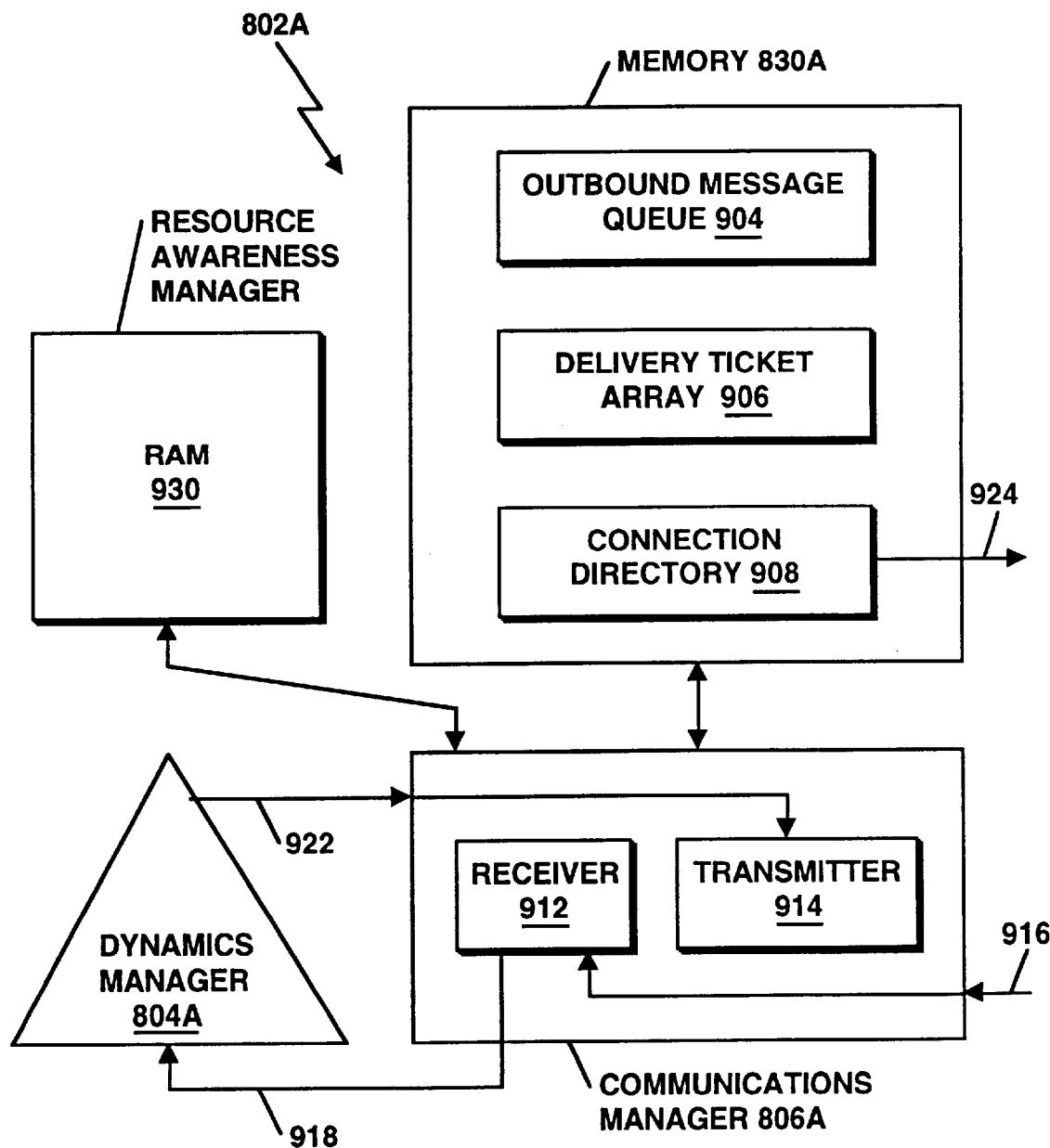

FIG. 9 shows-an implementation of certain components of the peer unit 802A involved in communication via the communications manager 806A. Memory 830A stores data in support of operation of the communications manager 806A. (The other peer units 802B–D have like memory structures to store data on behalf of their respective communications managers 806B–D.) As illustrated, the communications manager 806A maintains an outbound message queue structure 904 in memory 830A, which stores all outbound messages including deltas, preferably in XML form. The outbound message queue structure 904 can be implemented as a work list array containing messages (or referencing messages otherwise stored in the memory 830A) received from the dynamics manager 804A by the communications manager 806A for delivery to other peer units 802B–D. As such, the outbound message queue structure 904 can include the outbound deltas store 628 of FIG. 6. In addition to the outbound message queue structure 904, the memory 830A includes a delivery ticket array 906, which provides an association of message payload (e.g., formatted as a number of XML elements, where each XML element is a document fragment) with delivery endpoints for resource handling. The memory 830A further includes a connection directory 908, indexed by URLs of potential destination endpoints, including network-capable devices such as peer units 802A–D and the relay 814, for storing their respective connectability status.

The communications manager 806A includes a receiver 912 and a transmitter 914, which process a receive thread and a transmit thread, respectively. The receiver 912 receives inbound messages, including inbound deltas, over link 916 from other peer units 802B–D or the relay 814, and forwards them over link 918 to the dynamics manager 804A for handling,:as described elsewhere herein.

The transmitter 914 of the communications manager 806A obtains outbound messages over link 922 from the dynamics manager 804A. The transmitter 914 examines the outbound messages, and extracts the device URLs. Then, the transmitter 914 uses a "device URL to IP address" map 1001 in ramp 1002A (FIG. 10) to map the extracted device URLs to IP addresses. Finally, the transmitter 914 accesses the connection directory 908 to confirm connectability of the destination devices. As noted above, while the presence server provides the online/offline status of destination devices, the communications manager tracks and ultimately determines connectability. For each message, the transmitter 914, responsive to the presence and connectability status information, selects a path on which to forward the message to the named destination. If the destination device is on-line and connectable as indicated by the presence and connectability information, the transmitter 914 will direct the message to the URL of the destination device itself over link 924. If it is not online and reachable as indicated by the online and connectability information, the transmitter 914 will direct the message over link 924 to the relay 814, and include the destination device URL in the message for use by the relay in message forwarding. As described elsewhere, the relay 814 has local storage for holding pending messages until the destination devices return to online status and is connectable. On the other hand, if peer unit 802A is itself offline, the transmitter 914 maintains the outbound messages in the outbound message queue 904 until such time as peer unit 802A returns online, and then transmits the messages as described above. The message queue 904 is persisted over periods of shut down or reboot of the peer unit 802A, e.g., in XML format.

In an exemplary embodiment, the communications manager 806A maintains a copy of all transmitted messages, including all deltas, in the memory 830A until the communications manager of the destination peer unit 806B–D acknowledges successful receipt. If the acknowledgement is not received within a preselected period of time, the communications manager 806A will re-send the message. Absent a returned acknowledgement, the communications manager 806A will retry transmission for up to a preselected total number of attempts. The maximum number of retries can be preset for the ABC system or for a particular telespace, or can be user adjustable. If the maximum number of retries still does not produce an acknowledgment, the message to that destination peer unit can be discarded, or communication to that destination peer unit can be attempted by other channels, e.g., through the relay. Alternatively, there will sometimes not be a set maximum number of retries. If this is the case, and if the relay server is not reachable, the device will hold onto the message indefinitely, until either the peer device or the relay server becomes available.

Moreover, in some embodiments, a source peer unit can specify a period of time, called a "time-to-live" for each message. The communications manager for the source peer unit will store the time-to-live (TTL) in memory, e.g., with the copy of the message. Responsive to the TTL, the source peer unit will discard the message if it has not been successfully transmitted prior to the expiration of the TTL. In the exemplary embodiment where each destination peer unit sends an acknowledgement message back to the source peer unit to acknowledge receipt of a message, the source peer unit will discard a message if the acknowledgment has not been received prior to the TTL expiration. For example, if a message is sent, "Can you meet me for lunch at noon?," that message can have TTL data causing the sending endpoint to discard the message if the destination peer unit does not send an acknowledgement that is received prior to noon. Still other variations on this feature can provide that a message containing a delta will be discarded if the delta is not executed by the destination prior to the expiration of the TTL. The TTL period can be user specified at various levels of control, e.g., for all messages in a telespace, or for all messages of a particular type, or for each message, e.g., based on message content or destination endpoint.

In another exemplary embodiment, the communications manager 806A can be responsible for mapping a destination endpoint specified for a message into one or more other endpoints corresponding to different identities and automatically forwarding copies of the message to those other endpoints. Thus, even though a message specifies one destination URL, the communications manager 806A can be programmed to send the message to other URLs. For this, the communications manager 806A accesses an identity data structure, e.g., in XML format, stored in memory 808A, and maintained by the identity manager 408 (FIG. 4) for peer unit 802A. Then, responsive to the identity information extracted from the identity data structure, the communications manager 806A can forward a message that was addressed originally to a first destination peer unit to one or more other peer units in lieu of or including the first peer unit. For example, if a user wishes to send a message to a person within the telespace by the name of Jack, the user can specify a destination endpoint of Jack's home computer. The communications manager 806A can check the identity data structure, e.g., through the identity manager, and determine that Jack also has an endpoint at work. Then, the communications manager can forward the message to the work computer, either instead of the home computer or in addition to the home computer. This can be particular useful if the communications manager 806A determines that the home computer is offline or not reachable. Moreover, the communications manager 806A can recognize redundancies, e.g., where a message is to be sent to both Jack's home and work endpoints, and then choose to send the message to only one or the other to eliminate redundant or needless traffic. The to operation of the communications manager 806A with respect to identity routing as discussed in this paragraph can be under user control with respect to, e.g., each message, or can be preset for particular telespaces or types of messages or identities associated with destination endpoints. The identity data structure can contain instructions as to the endpoint to which messages should be sent, e.g., in order to reach particular persons, and those instructions can be updated from time to time by telespace members.

Figure 10:
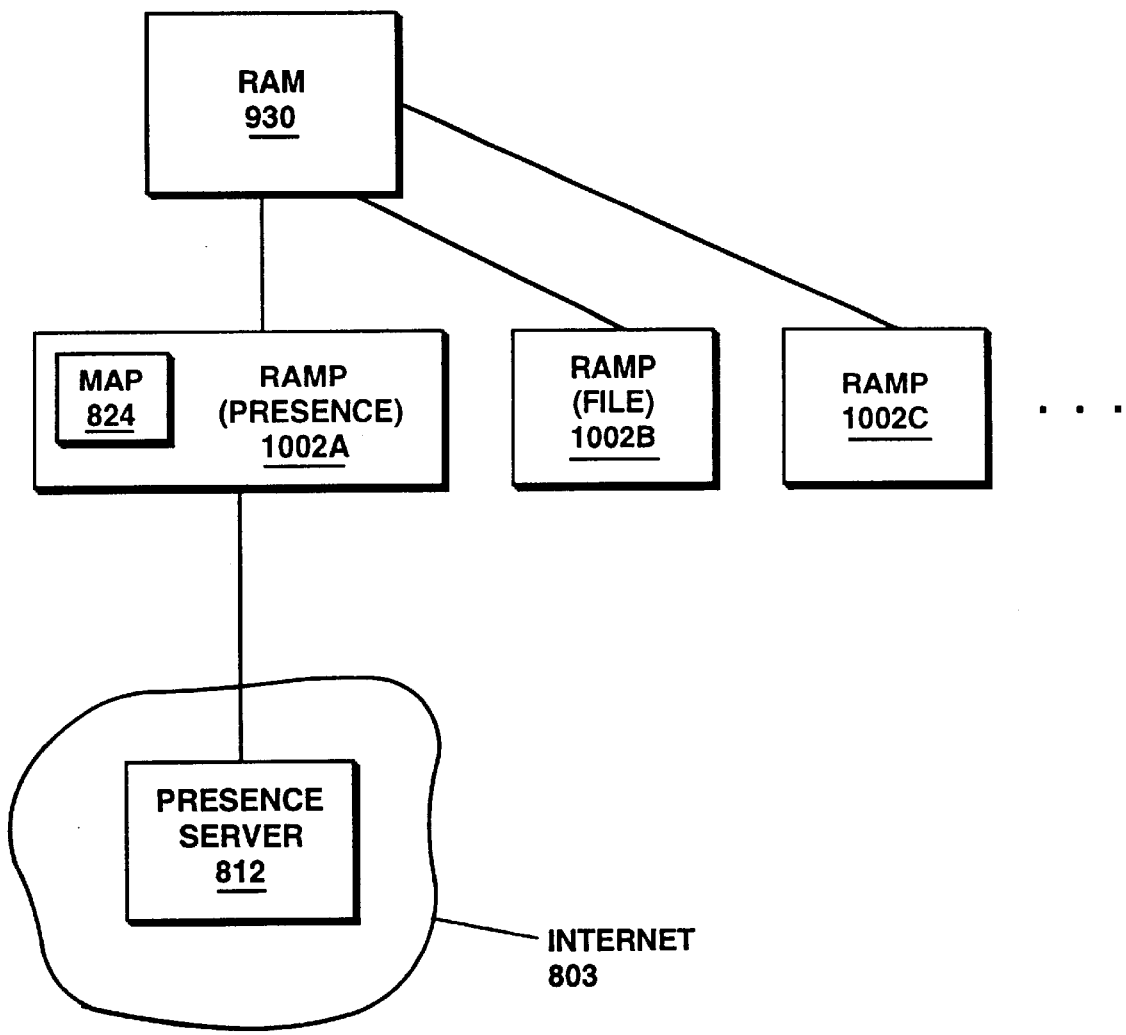
FIG. 10 is a block diagram illustrating use of the resource awareness manager of FIG. 9.

The communications manager 806A communicates also with a resource awareness manager (RAM) 930 within the peer unit 802A, which is responsible for managing resource information obtained from resource providers external to the peer unit 802A. Such information is useful or necessary for participation by peer unit 802A in telespaces in which it is a member. FIG. 10 shows an illustrative operation of a RAM 930 obtaining information from a number of sources, called resource awareness manager providers or RAMPs 1002A–C, including the presence server 812 as RAMP 1002A, a file server as RAMP 1002B, etc. The RAM 930 can determine the appropriate RAMP from which to obtain the information responsive to a request from the communications manager 806A. In response to the request, the RAM 930 returns the requested information asynchronously to the communications manager 806A. For example, in response to a request from communications manager 806A for the IP address corresponding to a particular URL, RAMP 1002A (the presence server) can perform the device URL to IP address mapping described above and return the requested IP address. The communications manager 806A caches the returned IP address, e.g., in memory 808A.

The operation of the RAMPs 1002A–C can best be explained in light of the following discussion of property sets. As used herein, a resource can include a person, document or device, each uniquely identified by an URL. For each property, the RAM stores a property set of descriptive information. The property set can be in the form of, e.g., 'string names', i.e., a standard list peculiar to the type of resource (i.e., person, document or device). The RAM 930 can query each RAMP 1002A–C to obtain a list of supported resource property names, and thus RAM operation can be characterized by dynamic discovery of the property set. In response to a request, the RAM 930 can return information, e.g., in XML format, preferably in a hierarchical data structure form. The returned information can be responsive to different types of requests, and can take the form of (a) a "static tag" response, which returns information as specifically requested regarding a specified URL, e.g., a local device; or (b) a "query" response, which returns information in response to a query. The query response can be structural, value based, or "update as modified". A value-based query response can be, for example, information (i) responsive to a relational operator (such as data regarding a certain period of time, or data for workers making a specified salary); or responsive to a positional value (i.e., collated in a specified order), or (c) responsive to an "update as modified" request, which returns information that has been modified since a last query from the requesting entity (e.g., file XXX renamed on YYYY). To illustrate, the RAM 930 can be asked to communicate with various RAMPs 1002A–C to obtain metadata about named resources, e.g., a specified person, or to obtain information specifying availability of particular persons to join in an online discussion. Returning to FIG. 8, the ABC system 800 provides for communication between peer units 802A–D via a peer-to-peer model. The ABC system 800 enables such communication regardless of the connection status of destination devices by providing a relay 814, e.g., a relay. The relay 814 is a logical proxy that can mediate communications in cases where direct peer-to-peer communication is not possible. The relay 814 is also a potential host for optimizing certain forms of communication within the collaboration environment. The relay 814 includes a memory 832 for storing messages, including deltas en route, a receiver 834 for receiving messages over the Internet 803, and a transmitter 836 for sending them over the Internet 803. During use of the relay 814, the peer units 802A–D can be referred to as "collaboration clients".

Figure 11:
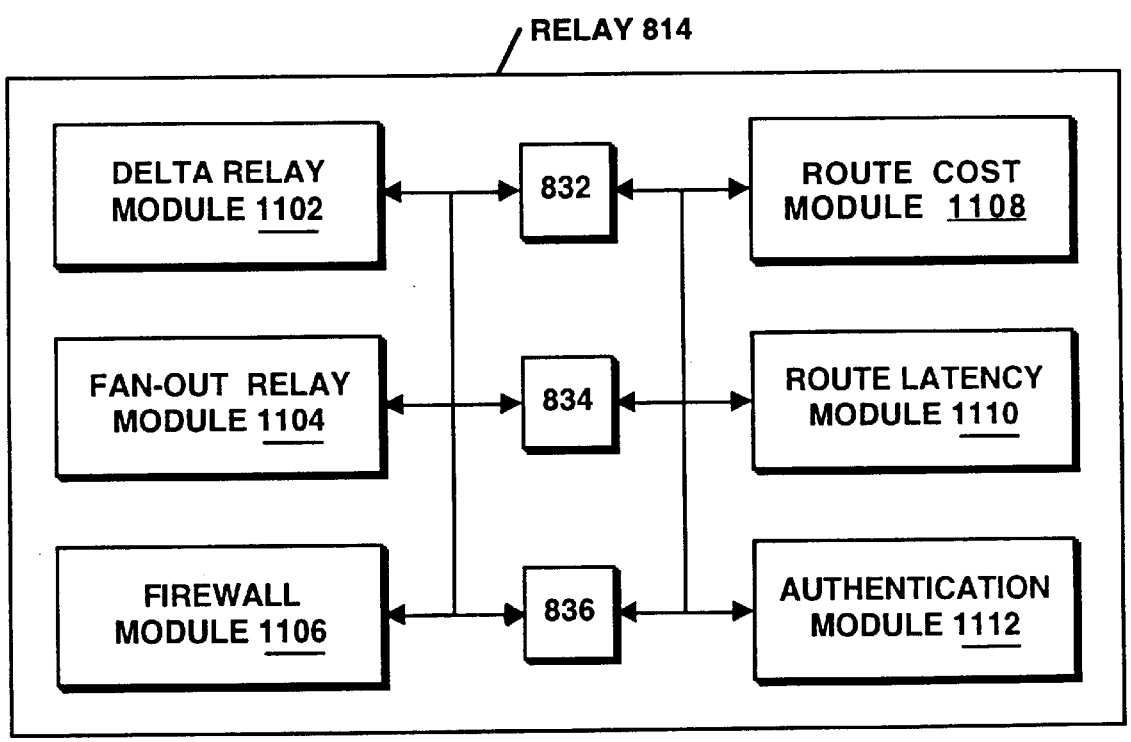
FIG. 11 is a block diagram of an embodiment of the relay of FIG. 8.

FIG. 11 shows an implementation of the relay 814 as including the following additional components:

Delta relay module 1102 for controlling delta relay services for disconnected destination clients.

Fan-out module 1104 for providing multicast or broadcast communication called "fan-out", in which messages can be sent to more than one destination device at the same time. This can be particularly useful when a sending peer unit 802A–D is connected to destination peer units by a relatively lower speed communication link 924 (FIG. 9) so that multiple point-to-point (unicast) transmissions would be overly time consuming.

Firewall module 1106 for providing a proxy for allowing authorized peer units 802A–D to send messages through firewalls, e.g., for communication over a public network with devices on a secured private network. Firewall module 1106 can achieve this because firewalls generally allow outbound traffic and not inbound traffic.

Route cost module 1108 for storing route cost information, and providing such information in response to route cost inquiries from peer units 802A–D. With this information, the collaboration clients can choose to send messages directly to destination peer units or via the relay depending on least cost routing determinations performed by the peer units 802A–D. The peer units 802A–D can store a local copy of the information, e.g., in the communications managers.

Route latency module 1110 for storing latency and throughput information, and providing such information in response to latency inquiries from peer units 802A–D. With this information, the collaboration clients can choose to send messages directly to destination peer units or via the relay depending on comparative latency routing determinations performed by the peer units 802A–D. This can be particularly useful when a sending peer unit 802A–D is connected to destination peer units by a relatively lower speed communication link 924 (FIG. 9). The peer units 802A–D can store a local copy of the information, e.g., in the communications managers.

Authentication module 1112 for providing authentication for communication messages, e.g., a "lock-on" form of authentication, preferably without encryption for simplicity and performance reasons.

Figure 12:
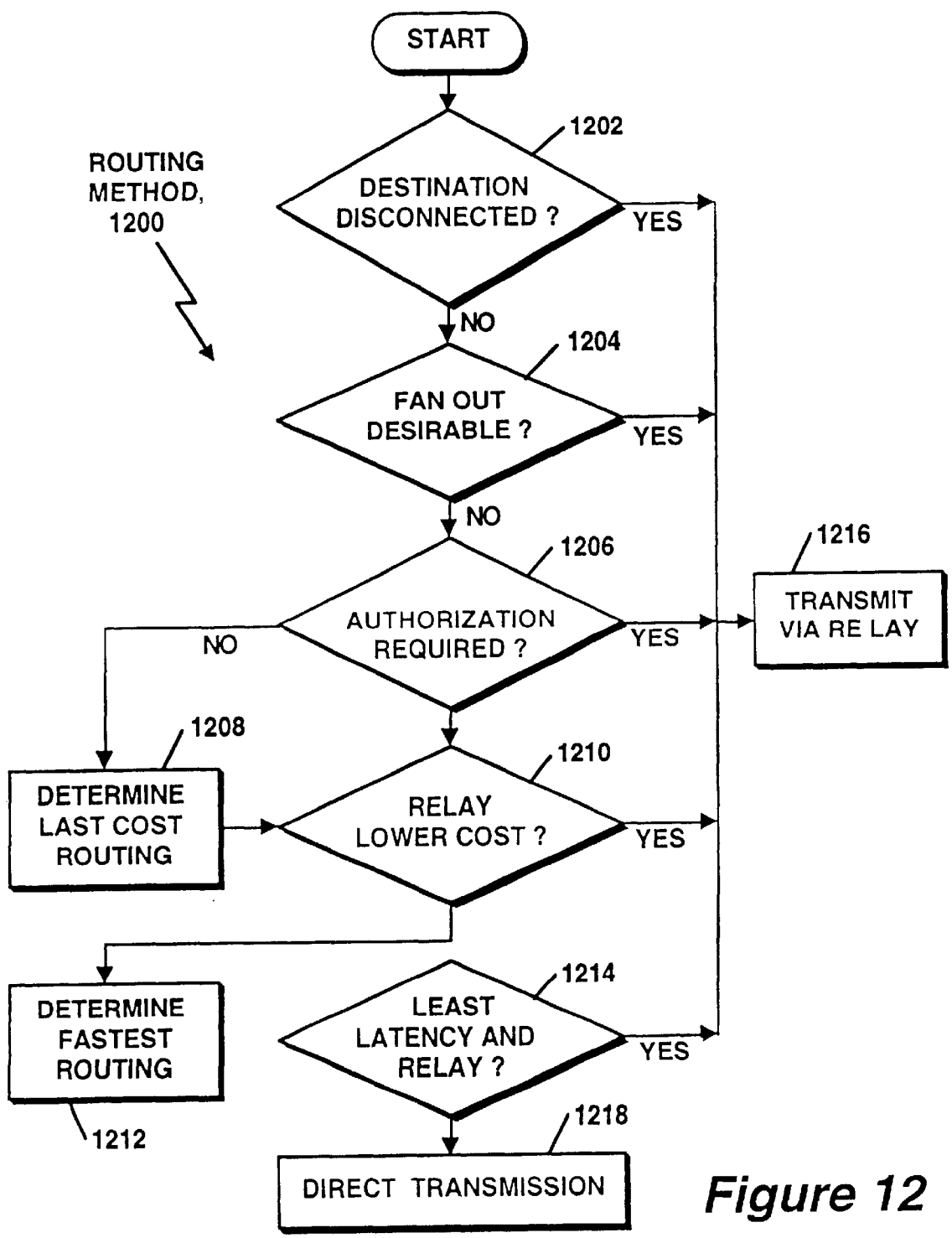
FIG. 12 is a block diagram of a routing method for the ABC system of FIG. 4.

FIG. 12 shows a routing method 1200 that can be implemented in the individual communications managers of the collaborative clients in determining an optimal routing for each outbound message. The routing method 1200 starts at step 1202, which tests the destination's connection status. The communications manager can keep its own connectability information, and can obtain "presence" information (i.e., online/offline status) from the presence server 812. If the destination is disconnected from the network, e.g., the Internet, step 1202 will conclude that the transmission needs to be made via the relay 814. Step 1204 tests whether the message is to be sent to multiple destinations, and whether the transmission can best be made using, e.g., fan-out services of module 1104 of the relay 814. For example, the communications manager can route the message via the relay 814 in cases where the number of destinations exceeds either a pre-programmed number, a user-specified number, or a number that is dynamically calculated based on available bandwidth, network congestion, and the total number of peer devices to which the message is being sent. Step 1206 tests if the destination requires that the transmission traverse a firewall into a secured network for which authorization is needed. If so, the relay 814 may be selected to make the transmission in cases where the relay is so authorized but the sending peer unit is not. Information regarding destination requirements and authorization can be obtained via the RAM 930 and the firewall module 1106 of the relay 814. Step 1208 determines, based on routing cost information provided by the RAM and the routing cost module 1108 of the relay 814, the comparative cost of sending the message directly verses sending it by way of the relay. Least cost routing can be, e.g., automatically performed for all communications, or an operator selected option. If so enabled, and the test of step 1210 indicates that the relay provides the least cost alternative, then the message is sent at step 1210 by the relay 814. Step 1212 makes a similar determination with respect to speed of routing, based on information obtained from the RAM 930 and the route latency module 1110 of the relay 814. Least latency routing can be, e.g., automatically performed for all communications, or an operator selected option. If so enabled, and if the test of step 1214 indicates that the relay provides the least latency alternative, then the message is sent at step 1214 by the relay 814. If not sent via the relay, step 1218 causes the message to be sent directly to the destination peer unit. It can be readily understood that the order of steps 1202–1218 can be appropriately changed and/or the described tests refined to accommodate the needs of particular implementations.

The ABC system can be multitasking and multithreading in that each tool-engine combination forming an activity can correspond to a separate dynamics manager, and multiple dynamics managers can be provided to accommodate multiple simultaneously operating activities. While a one-to-one relationship between telespaces and dynamics managers may introduce the least latency in handling deltas, thread starvation could give rise to an error or fault condition. On the other hand, single dynamics managers supporting many telespaces could give rise to congestion problems. The optimal numbers of each component will depend on the hardware application, number of participating peer units, and traffic conditions.

The ABC system can comprise plural computer systems (CS), each with one or more telespaces (TS), each instantiating one or more activity components, each activity component having a tool (T), engine (E) pair, whose operation is coordinated by a dynamics manager (DM). Thus, the ABC system can have multiple telespaces with one or more dynamics managers. Accordingly, the ABC system can be formed, for example, as follows:

$$ABC \text{ system} = CS_1 = DM_1 + A_1, \text{ where } A_1 = T_1 + E_1$$

$$CS_2 = DM_2 + A_2, \text{ where } A_2 = T_2 + E_2$$

$$...$$

$$...$$

$$CS_n = DM_n + A_n, \text{ where } A_n = T_n + E_n$$

where all the activities $A_1, A_2$, and $A_n$ reside in one or more telespaces, and "n" is a positive interger. Thus, by way of illustration, the following are examples of various telespace instantiations:

$TS \subset A_1$, or $TS \subset A_1 + A_2$ or $TS \subset A_1 + A_2 . . . , A_m$.

or $TS_1 \subset A_1$ $TS_2 \subset A_2$ ., and $TS_m \subset A_m$ where the symbol " $\subset$ " means "a set comprising", and "m" is a positive integer. Accordingly, each telespace can instantiate one or more activities, and the framework can have a single telespace; alternatively, each telespace can instantiate of one or more activities, and the framework can have multiple telespaces.

A software implementation of components of the above-described embodiment may comprise computer instructions and routines either fixed on a tangible medium, such as a computer-readable media, e.g. the diskette 142, CD-ROM 147, ROM 115, or fixed disk 152 of FIG. 1, or transmittable via a modem or other interface device, such as communications adapter 190 connected to the network 195 over a medium 191. Medium 191 can be either a tangible medium, including but not limited to optical or hard-wire communications lines, or may be implemented with wireless techniques, including but not limited to microwave, infrared or other transmission techniques. It may also be the Internet. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims.

What is claimed is:

1. A local network-capable device adapted for collaborative operation and communication over a network with at least one remote network-capable device, said local network-capable device comprising:

A) a memory for storing a local copy of data in accordance with a data model;

B) a data-change engine coupled with the memory, and responsive to a plurality of data change requests, for controlling storage of the local copy of data in the memory in accordance with the data model and making changes to the local copy of the data; the data change requests including a locally-generated data change request and a remotely-generated data change request;

C) a dynamics manager, coupled with the data-change engine, and responsive to the data change requests for controlling the engine and coordinating execution of the data change requests;

D) a communications manager, coupled with the dynamics manager for sending the locally-generated data change request to the at least one remote capable-device and for receiving the remotely-generated data change request, wherein the communications manager is responsive to a presence mechanism for sending the local data change request over the network to the at least one remote network-capable device when the at least one remote network-capable device is connected to the network, and for sending the local data change request over the network to a relay if the at least one remote network-capable device is disconnected from the network.

2. The local network-capable device in accordance with claim 1, wherein the communications manager directs the relay to forward the local data change request to the at the least one remote network-capable device when the at the least one remote network-capable device is reconnected to the network.

3. The local network-capable device in accordance with claim 1, wherein the communications manager sends to the presence mechanism over the network a connection status notification indicating whether the local network-capable device is connected to the network and therefore capable of receiving the remotely-generated data change request.

4. The local network-capable device in accordance with claim 1, wherein the communications manager receives a remotely-generated data change request from the remote network-capable device and forwards the received data change request to the dynamics manager; and wherein the dynamics manager directs the data-change engine to execute the received remotely-generated data-change request.

5. The local network-capable device in accordance with claim 1, in combination with the presence mechanism and the relay.

6. The combination in accordance with claim 5, wherein the presence mechanism stores an indication of online/offline status for the local and remote network-capable devices.

7. The combination in accordance with claim 6, wherein the communications manager sends the locally-generated data change request over the network to the relay if the at least one remote network-capable device is disconnected from the network; the relay comprises a store and forward relay having a relay memory; and the relay stores the locally-generated data change request in the relay memory, and forwards the locally-generated data change request to the at least one remote network-capable device when the at least one remote network-capable device is connected to the network.

8. The combination in accordance with claim 5, wherein the at least one remote network-capable device includes a plurality of remote network-capable devices; and the relay, responsive to the communications manager, is capable of forwarding the locally-generated data change request to the plurality of remote network-capable devices using multicasting.

9. The combination in accordance with claim 8, wherein the communications manager can send the local data change request, responsive to least latency information, by one of direct communication and intermediary communication; the direct communication comprising sending the local data change request directly to one or more of the remote network-capable devices; and the intermediary communication comprising sending the local data change request to one or more of the remote network-capable devices via the relay.

10. The combination in accordance with claim 8, wherein the communications manager can send the local data change request, responsive to least cost information, by one of direct communication and intermediary communication; the direct communication comprising sending the local data change request directly to one or more of the remote network-capable devices; and the intermediary communication comprising sending the local data change request to one or more of the remote network-capable devices via the relay.

11. A distributed, coordinated system for maintaining plural copies of data pursuant to a distributed data model, which copies can be changed responsive to users' actions by a plurality of computer systems, the system comprising:

A) a plurality of computer systems, each of the computer systems capable of locally generating a plurality of data change requests for changing a local copy of the data and of executing data change requests including the locally-generated data change requests and remotely-generated data change requests generated by others of the computer systems so as to make the requested changes to the local copy of the data; each of the computer systems including a communications manager for transmitting locally-generated data change requests over a network directly to destinations comprising others of the computer systems when the destinations are connected to the network and for receiving remotely-generated data change requests over the network from the others of the computer systems; and B) a relay for receiving data change requests transmitted from one of the communications managers when the destinations of the data change requests are not connected to the network and for forwarding the received data change requests to the destinations of the data change requests when the destinations are reconnected to the network.

12. The system in accordance with claim 11, further comprising a presence server coupled over the network with the computer systems for storing information indicating whether each of the computer systems is connected or disconnected from the network.

13. The system in accordance with claim 11, wherein each computer system further comprises:

A) a tool for receiving local data change requests;

B) an engine separate from the tool for controlling the local copy of the plural copies of the data, and for making changes to the local copy in accordance with the data model; and C) a dynamics manager, responsive to the local and remote data change requests, for controlling the engine in making the change.

14. A distributed, coordinated system for maintaining plural copies of data pursuant to a distributed data model, which copies can be changed responsive to users' actions by a plurality of computer systems, the system comprising:

A) a plurality of computer systems, each of the computer systems capable of locally generating a plurality of data change requests for changing a local copy of the data and of executing data change requests including the locally-generated data change requests and remotely-generated data change requests generated by others of the computer systems so as to make the requested changes to the local copy of the data; each of the computer systems including a communications manager for transmitting locally-generated data change requests over a network to destinations comprising others of the computer systems and for receiving remotely-generated data change requests over the network from the others of the computer systems; and B) a relay for receiving data change requests transmitted from one of the communications managers and forwarding the received data change requests when the destinations are connected to the network, wherein the communications managers can determine whether to send data change requests directly to destinations or via the relay based at least in part on least cost routing information.

15. A distributed, coordinated system for maintaining plural copies of data pursuant to a distributed data model, which copies can be changed responsive to users' actions by a plurality of computer systems, the system comprising:

A) a plurality of computer systems, each of the computer systems capable of locally generating a plurality of data change requests for changing a local copy of the data and of executing data change requests including the locally-generated data change requests and remotely-generated data change requests generated by others of the computer systems so as to make the requested changes to the local copy of the data; each of the computer systems including a communications manager for transmitting locally-generated data change requests over a network to destinations comprising others of the computer systems and for receiving remotely-generated data change requests over the network from the others of the computer systems; and B) a relay for receiving data change requests transmitted from one of the communications managers and forwarding the received data change requests when the destinations are connected to the network, wherein the communications managers can determine whether to send data change requests directly to destinations or via the relay based at least in part on least latency routing information.

16. A framework apparatus for providing communication services for an activity-based collaboration system in which data change requests comprising deltas are communicated over a network between network-capable devices, the framework apparatus comprising a communications manager operable on a local network capable device for sending locally-generated deltas over a network to at least one remote network-capable devices and for receiving remotely-generated deltas from the at least one remote network-capable device; the communications manager being responsive to network connection status information indicating that the remote network-capable device is connected to the network for sending the local deltas directly to an address for the remote network-capable device, and responsive to network connection status information indicating that the remote network-capable device is disconnected from the network for sending the local deltas to an address of a relay.

17. The framework apparatus in accordance with claim 16, wherein the communications manager receives the network connection status information over the network from a presence mechanism.

18. The framework apparatus in accordance with claim 16, further comprising computer readable media, and wherein the communications manager comprises computer-readable program code stored on the media.

19. The framework apparatus in accordance with claim 16, in combination with the relay, wherein the relay includes a memory for storing deltas until the relay is notified that the remote network-capable device has reconnected to the network, and a transmitter for sending the deltas to the reconnected remote network-capable device.

20. The framework apparatus in accordance with claim 16, wherein the communications manager includes means for sending a network connection status notification to the presence server indicating whether the local network-capable device is connected to the network and therefore capable of receipt of deltas from remote network-capable devices.

21. The framework apparatus in accordance with claim 16, further comprising a dynamics manager, responsive to the locally-generated and remotely generated deltas, for controlling a data-change engine included in the local network-capable device for making changes to stored data as indicated by the locally-generated and remotely-generated deltas.

22. The framework apparatus in accordance with claim 21, further comprising computer readable media, and wherein the communications manager and the dynamics manager each comprise computer-readable program code stored on the media.

23. A method for providing communication services for an activity-based collaboration system, in which data change requests comprising deltas are communicated over a network between network-capable devices, the method comprising the steps of:

A) sending locally-generated deltas from a local network-capable device over a network to at least one remote network-capable devices and for receiving remotely-generated deltas from the at least one remote network-capable device;

B) responsive to network connection status information indicating that the remote network-capable device is connected to the network, sending the local deltas directly to an address for the remote network-capable device;

C) responsive to network connection status information indicating that the remote network-capable device is disconnected from the network, sending the local deltas to an address of a relay.

24. The method in accordance with claim 23, wherein the network connection status information includes online/offline status information, and the method further comprises the step of receiving the online/offline status information over the network from a presence mechanism.

25. The method in accordance with claim 24, further comprising the step of a presence mechanism maintaining and distributing, over the network, the online/offline status information; the presence mechanism acquiring the online/offline status information for each of the network-capable devices by an online/offline notification from each of the network-capable device.

26. The method in accordance with claim 24, further comprising the step of the relay storing deltas until the relay is notified that the remote network-capable device has reconnected to the network, and the relay sending the deltas to the reconnected remote network-capable device.

27. The method in accordance with claim 23, further comprising the step of the local network-capable device sending an online/offline status notification to the presence server indicating whether the local network-capable device is connected to the network and therefore capable of receipt of deltas from remote network-capable devices.

28. The method in accordance with claim 23, further comprising the step of a communications manager included in the local network-capable device determining the connectability of the at least one remote network-capable device from connectability information included in the network status information and maintained by the communications manager.

29. The method in accordance with claim 28, further comprising the step of maintaining, by a presence mechanism, online/offline status information for the at least one remote network-capable device; the online/offline status information being included in the network connection status information.

30. The method in accordance with claim 23, further comprising persistently storing the locally-generated deltas in the local network-capable device until the deltas can be sent to the at least one remote network-capable device.

31. The method in accordance with claim 23, wherein the sending step sends the locally-generated deltas to a plurality of remote network-capable devices, the sending step includ ing the step of multicasting the locally generated deltas to the remote network-capable devices.

32. The method in accordance with claim 23, further comprising the step of repeating the sending step if an acknowledgement message is not received from the at least one remote network-capable device for up to a maximum number of retries.

33. The method in accordance with claim 32, further comprising associating time-to-live data with each of the deltas, and discarding each of the deltas after the associated time-to-live has expired.

34. The method in accordance with claim 23, wherein the sending step includes the step of directing the message to the at least one remote network-capable devices in response to identity information stored in the local network-capable device.

* * * * *